US012398594B2

(12) United States Patent
Zhang et al.

(10) Patent No.: US 12,398,594 B2
(45) Date of Patent: Aug. 26, 2025

(54) SCREEN DOORS

(71) Applicant: QINGDAO SEA NOVA BUILDING PROFILES PRODUCTS CO., LTD., Jiaozhou (CN)

(72) Inventors: Jianxun Zhang, Jiaozhou (CN); Yi Cao, Jiaozhou (CN); Enci Chang, Jiaozhou (CN); Minghui Chen, Jiaozhou (CN); Xuhui Wu, Jiaozhou (CN)

(73) Assignee: QINGDAO SEA NOVA BUILDING PROFILES PRODUCTS CO., LTD., Jiaozhou (CN)

( * ) Notice: Subject to any disclaimer, the term of this patent is extended or adjusted under 35 U.S.C. 154(b) by 351 days.

(21) Appl. No.: 18/118,104

(22) Filed: Mar. 6, 2023

(65) Prior Publication Data

US 2024/0191569 A1 Jun. 13, 2024

(30) Foreign Application Priority Data

Dec. 7, 2022 (CN) ........................ 202211561002.9

(51) Int. Cl.
*E06B 9/58* (2006.01)
*E06B 9/54* (2006.01)

(52) U.S. Cl.
CPC . *E06B 9/54* (2013.01); *E06B 9/58* (2013.01)

(58) Field of Classification Search
CPC ........ E06B 2009/543; E06B 9/54; E06B 9/58; E06B 9/42; E06B 2009/527; E06B 9/52; E06B 9/522; E06B 9/581; E06B 9/56
See application file for complete search history.

(56) References Cited

U.S. PATENT DOCUMENTS

| | | | | |
|---|---|---|---|---|
| 7,487,816 B2 * | 2/2009 | Moriya | E06B 9/54 160/31 |
| 10,947,779 B2 * | 3/2021 | Hummel | E06B 9/58 |
| 2005/0098276 A1 * | 5/2005 | Agliolo Quartalaro | E06B 9/54 160/276 |
| 2007/0029049 A1 * | 2/2007 | Martineau | E06B 9/54 160/23.1 |
| 2007/0199667 A1 * | 8/2007 | Jumbeck | E06B 9/54 160/274 |
| 2007/0284893 A1 * | 12/2007 | Davies | E05C 9/045 292/336.3 |
| 2015/0308187 A1 | 10/2015 | Lu et al. | |
| 2018/0148974 A1 * | 5/2018 | Roberts | E05D 15/26 |
| 2019/0301242 A1 * | 10/2019 | Shipman | E06B 9/50 |
| 2024/0175311 A1 * | 5/2024 | Chen | E06B 3/365 |

* cited by examiner

*Primary Examiner* — Abe Massad

(57) ABSTRACT

Disclosed is an adjustable retractable screen door including a retractable screen door, wherein a screen housing is sleeved with an end cap, the end cap includes a housing and a guide leg, the end cap is connected with a screen channel through the guide leg, and the screen channel is provided with an end cap connection channel and a handle slide channel. This mounting accessory is used for compatibly mounting the above-mentioned adjustable retractable screen door and includes an upper mounting adapter and a lower mounting adapter. The upper mounting adapter includes an upper mounting block and an adjustment block which cooperates with the upper mounting block and a connector, the upper mounting block includes a screw boss, an adjustment screw and a locator guide, and the adjustment block includes a threaded hole and a guide bump.

9 Claims, 41 Drawing Sheets

SCREEN DOORS

RELATED APPLICATION

The application claims the benefit of the Chinese Patent Application CN202211561002.9 filed Dec. 7, 2022, which is incorporated herein by reference in its entirety.

FIELD OF THE INVENTION

The present invention relates to the field of retractable screen doors, and in particular, to an adjustable retractable screen door and a mounting accessory therefor.

BACKGROUND OF THE INVENTION

A sliding door is a commonly used door and refers to a door which may be pushed and pulled. A door leaf of the sliding door is horizontally moved in a push-pull way on a vertical plane so as to be opened or closed. To achieve functions such as ventilation and dust prevention in an open state of the sliding door, a sliding screen door is usually configured. Meanwhile, to mount the sliding screen door, a corresponding sliding structure may be configured on a sliding door frame.

However, a conventional sliding screen door also has certain defects. The sliding screen door will inevitably block a part of a door leaf to make them impassable (except that a non-sliding structure extends into a wall, so that the sliding screen door can slide into the wall). Furthermore, the sliding screen door cannot be retracted and can only be removed as a whole. A retractable screen door can well overcome the above-mentioned defects. However, a sliding door frame is required to be customized independently during the use of the retractable screen door. Otherwise, it cannot be mounted or put into use because of compatibility issues.

Therefore, when the corresponding sliding door frame is not designed independently, a retractable screen door compatible with most of existing sliding doors on the market or a mounting accessory for the universal assembly of the retractable screen door is required to overcome differences in sectional structures of door frame profiles from different suppliers—the differences in the sectional structures of the door frame profiles will lead to different heights of an inner edge of the door frame, and there will also be differences in spatial structures provided for mounting the screen door—and satisfy compatible mounting of the retractable screen door.

OBJECTS AND SUMMARY OF THE INVENTION

To resolve above-mentioned problems, the present invention discloses an adjustable retractable screen door and a mounting accessory therefor.

Specific technical solutions are described as follows.

An adjustable retractable screen door includes a retractable screen door, and the retractable screen door includes a screen housing, a screen and a handle housing. The screen is elastically rolled in the screen housing. An end of the screen is connected to the handle housing. An end of the screen housing is sleeved with an end cap. The end cap includes a housing for accommodating an end of the retractable screen door and a guide leg. A screen outlet allowing the screen to be pulled out of the retractable screen door is configured on a side of the housing, the guide leg and the screen outlet are configured on a same side. A side of the guide leg is provided with a stripe-shaped spring lock.

The end cap is connected to a screen channel through the guide leg. The screen channel is provided with an end cap connection channel and a handle slide channel. The guide leg, which is in clearance fit with the end cap connection channel, is inserted into an end of the end cap connection channel. A locking slot which cooperates with the spring lock is configured on an outer wall of an end of the end cap to which the guide leg and the end cap connection channel are connected. A handle slide body is configured on a side of an upper end of the handle housing. A handle slide body is configured on a side of a lower end of the handle housing. The handle housing is in sliding fit with the screen channel through the handle slide body and through the handle slide channel.

In an embodiment, the guide leg and the housing are configured on an integrated piece.

In an embodiment, the spring lock is provided with a locking projection. The locking projection engages the locking slot for locking and connecting parts. A spring stripe is configured between the spring lock and the guide leg. At least one spring stripe is provided. In an embodiment, the spring stripe has an arc shape.

In an embodiment, a pair of the end caps includes an upper end cap which sleeves an upper end of the screen housing and a lower end cap which sleeves a lower end of the screen housing. The screen channel includes a top screen channel which is connected to the upper end cap and a lower screen channel which is connected to the lower end cap. The handle slide channel includes a screen slide opening slot and a slide channel adjacent to the screen slide opening slot 43. A height of the screen slide opening slot along a vertical direction is less than a height of the slide channel along a vertical direction. The handle slide body is in sliding fit with one of the screen slide opening slots and with the slide channel.

The handle slide body which is located on an upper end of the handle housing is a handle housing top slide. The handle slide body which is located on a lower end of the handle housing is a handle housing lower slide. The screen slide opening slot which is located on the top screen channel is an upper weatherstrip slot. The slide channel which is located on the top screen channel is a top slide channel. The screen slide opening slot which is located on the lower screen channel is a lower weatherstrip slot. The slide channel which is located on the lower screen channel is a lower slide channel.

A mounting accessory for the adjustable retractable screen door is used for connecting an upper end of the above-mentioned adjustable retractable screen door with a door head jamb of a sliding door and connecting a lower end of the above-mentioned adjustable retractable screen door with a door sill of the sliding door to achieve the mounting of the adjustable retractable screen door on a sliding door frame. The mounting accessory includes an upper mounting adapter and a lower mounting adapter. The upper mounting adapter includes an upper mounting block and an adjustment block which cooperates with the upper mounting block and a connector. The upper mounting block includes a screw boss, an adjustment screw for adjusting a mounting height of the adjustment block and a locator guide for orienting the adjustment block. The adjustment block includes a threaded hole and a guide bump which cooperates with the locator guide for positioning. The adjustment block is mounted on the upper mounting block through the locator guide and through the guide bump. The upper mounting block includes a clearance hole. The adjustment screw, which penetrates into the clearance hole, is rotatably configured on the upper mounting block through a retainer clip. The adjustment screw, which is in thread fit with the threaded hole, rotates itself to drive the adjustment block which is caused to get close to or move away from the upper mounting block. The upper mounting block further includes a connection slot and an alignment tab. The connector is in clamping connection with the upper mounting block through the connection slot. The lower mounting adapter has a quadrangular cross section, a horizontal upper end surface and an obliquely-disposed lower end surface. The lower mounting adapter includes a screw channel on its horizontal side and a stripe-shaped gap on its lower end surface. A side of the gap includes a stop leg.

A side of the adjustment block is connected with a support leg. A side of the upper mounting block includes an adjustment block step which is a step.

In an embodiment, the upper mounting block includes a mounting block top surface and a mount surface. The screw boss, the adjustment screw and the locator guide protrude out of the mounting block top surface. The screw boss includes a columnar clearance hole. The locator guide is columnar. The guide bump and the locator guide cooperate in their shapes. The connection slot and the alignment tab protrude out of the mount surface. The connector is mounted on the mount surface.

In an embodiment, a side of an upper end surface of the lower mounting adapter includes a lower mounting adapter stop. The lower mounting adapter stop protrudes out of the upper end surface of the lower mounting adapter.

In an embodiment, the locator guide is in clearance fit with the guide bump.

In an embodiment, the connector is slidably connected to the end cap connection channel in the screen channel. The alignment tab is in clearance fit with the end cap connection channel to attain a slidable connection between the upper mounting adapter and the screen channel.

In an embodiment, a lower end surface of the lower mounting adapter includes a stripe-shaped double-sided tape for compensating a mounting angle. The double-sided tape is a foam gasket or a rubber gasket.

The present invention has the following beneficial effects.

The present invention discloses an adjustable retractable screen door and a mounting accessory therefor, and relates to the field of retractable screen doors. This adjustable retractable screen door includes a retractable screen door. A screen housing is sleeved with an end cap. The end cap includes a housing and a guide leg. The end cap is connected with a screen channel through the guide leg. The screen channel is provided with an end cap connection channel and a handle slide channel. This mounting accessory is configured to compatibly mount the above-mentioned adjustable retractable screen door and includes an upper mounting adapter and a lower mounting adapter. The upper mounting adapter includes an upper mounting block and an adjustment block which cooperates with the upper mounting block and a connector. The upper mounting block includes a screw boss, an adjustment screw and a locator guide. The adjustment block includes a threaded hole and a guide bump. The adjustable retractable screen door can be easily mounted on an existing sliding door on the market through the upper mounting adapter or the lower mounting adapter, so that a requirement for compatibly and rapidly mounting the retractable screen door is satisfied, and defects existing in a sliding screen door in the prior art are overcome.

Figure 1:
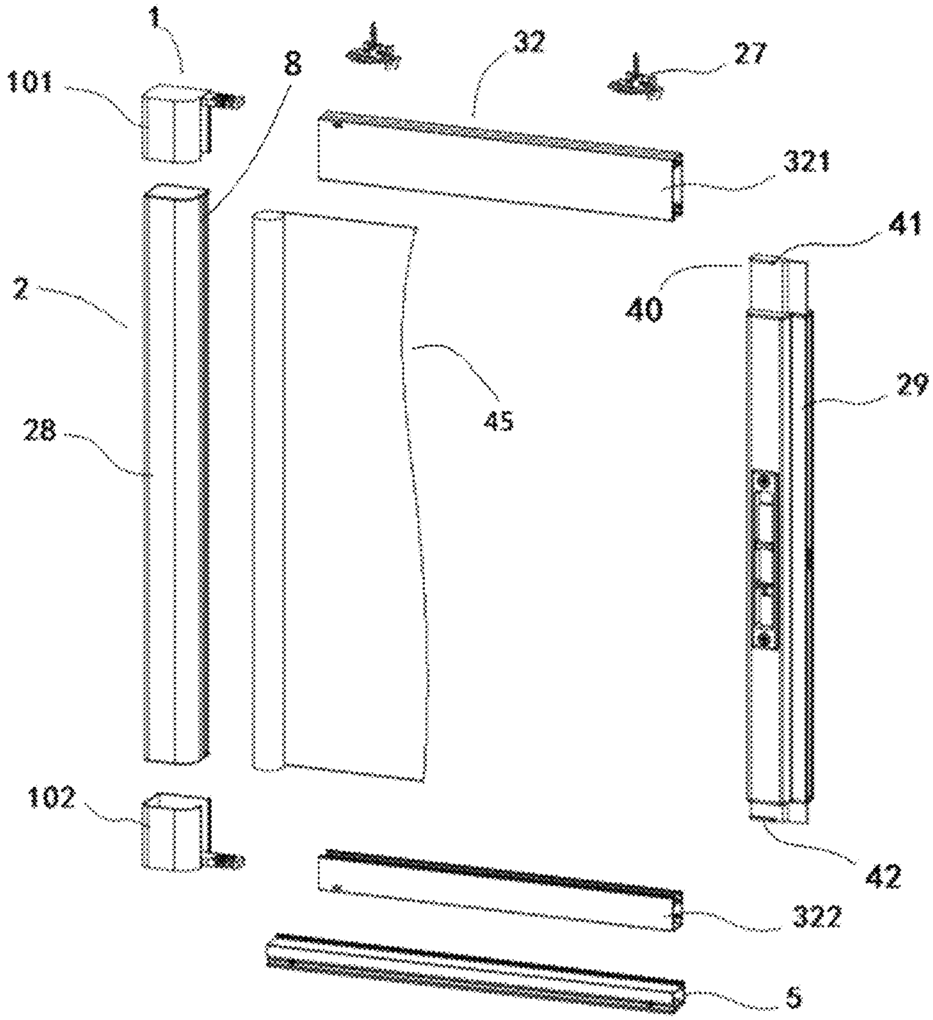
FIG. 1 is an exploded view of an adjustable retractable screen door and a mounting accessory.

Reference numerals: 1) end cap; 2) retractable screen door; 3) first housing; 4) first guide leg; 5) lower mounting adapter; 6) upper mounting block; 7) adjustment block; 8) screen outlet; 9) first elongated spring lock; 10) screw channel; 11) elongated gap; 12) stop leg; 13) screw boss; 14) adjustment screw; 15) locator guide; 16) threaded hole; 17) guide bump; 18) support leg; 20) locking projection; 21) spring stripe; 22) elongated double-sided tape; 23) mounting block top surface; 24) mount surface; 25) connector; 26) adjustment block step; 27) upper mounting adapter; 28) screen housing; 29) handle housing; 30) door head jamb; 31) door sill; 32) screen channel; 33) first locking slot; 34) head jamb screen track channel; 35) head jamb screen track; 36) sill screen track; 37) screen track channel; 38) first end cap connection channel; 39) first handle slide channel; 40) handle slide body; 41) handle housing top slide; 42) handle housing lower slide; 43) screen slide opening slot; 44) slide channel; 45) screen; 101) upper end cap; 102) lower end cap; 141) clearance hole; 142) retainer clip; 251) lower mounting adapter stop; 321) top screen channel; 322) lower screen channel; 431) upper weatherstrip slot; 441) top slide channel; 432) lower weatherstrip slot; 442) lower slide channel; 601) connection slot; 602) alignment tab; 46) second housing; 47) second guide leg; 48) second elongated spring lock; 49) second handle slide channel; 50) second end cap connection channel; and 51) second locking slot.

DETAILED DESCRIPTION OF THE EMBODIMENTS

To make the technical solutions of the present invention clearer, the present invention will be described below in conjunction with embodiments. Any solutions obtained by equivalently substituting and conventionally reasoning the technical features of the technical solutions of the present invention falls into the protection scope of the present invention.

Embodiment 1

As shown in FIGS. 1 to 6, the present embodiment discloses an adjustable retractable screen door applicable as a sliding door and is used for replacing an old-fashioned sliding screen door. This adjustable retractable screen door includes a retractable screen door 2, and the retractable screen door 2 includes a screen housing 28, a screen 45 and a handle housing 29. The screen 45 is elastically rolled in the screen housing 28. An end of the screen 45 is connected to the handle housing 29. In an embodiment, an end of the screen housing 28 is sleeved with an end cap 1. The end cap 1 includes a first housing 3 and a first guide leg 4 which are configured on an integrated piece. The first housing 3 sleeves an end of the retractable screen door 2. A screen outlet 8 allowing the screen to be pulled out of the retractable screen door 2 is configured on a side of the first housing 3 to facilitate pulling out and withdrawing the screen. In an embodiment, the first guide leg 4 and the screen outlet 8 are configured on a same side. A side of the first guide leg 4 is provided with a first elongated spring lock 9.

The opening or closing of the retractable screen door 2 is achieved by pushing and pulling the handle housing 29. To guide a pushing/pulling direction of the handle housing 29, in the present embodiment, the end cap 1 is connected to a screen channel 32 through the first guide leg 4. The screen channel 32 is provided with a first end cap connection channel 38 for connecting the end cap 1 and the screen channel 32 and a first handle slide channel 39 for guiding the pushing/pulling direction of the handle housing 29.

The first guide leg 4 is inserted into an end of the first end cap connection channel 38 so that a connection between the screen channel 32 and the end cap 1 is achieved. In an embodiment, the first guide leg 4 is in clearance fit with the first end cap connection channel 38. A first locking slot 33 is configured on an outer wall of an end of the end cap to which the first guide leg 4 and the first connection channel 38 are connected. The first locking slot 33 cooperates and is in clamping connection with the first elongated spring lock 9, so that the strength and stability of a connection between the screen channel 32 and the end cap 1 is attained. A handle slide body 40 is disposed on a side of an upper end of the handle housing 29. A handle slide body 40 is disposed on a side of a lower end of the handle slide body 40. The handle slide body 40 is in sliding fit with the first handle slide channel 39, so that a slidable connection between the handle housing 29 and the screen channel 32 and a guide for the pushing/pulling direction of the handle housing 29 is achieved.

The adjustable retractable screen door in the present embodiment is used for replacing the old-fashioned sliding screen door and is mounted on the sliding door frame. The screen door is closed immediately after being opened as required in use, so that the normal use of a door leaf cannot be hindered when the screen door is not used.

Embodiment 2

Figure 3:
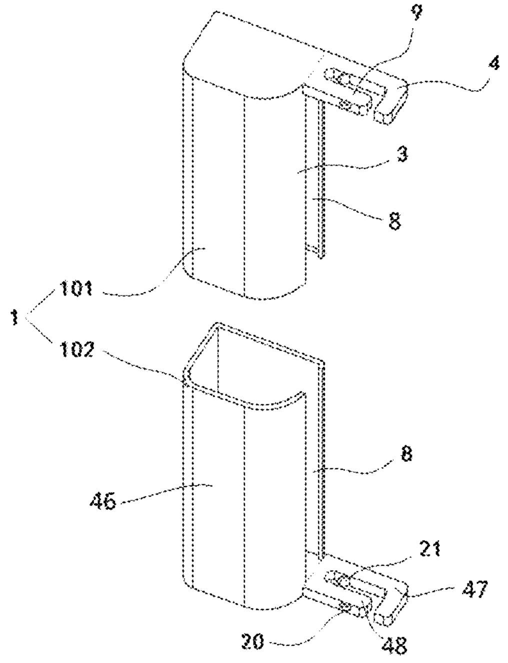
FIG. 3 is a schematic view of an end cap.
Figure 4:
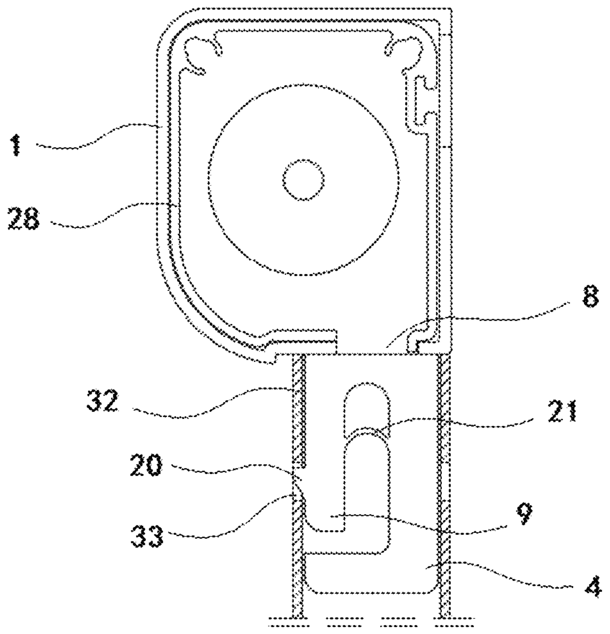
FIG. 4 is a schematic view of a connection state between the end cap and the screen channel (single spring lock)
Figure 5:
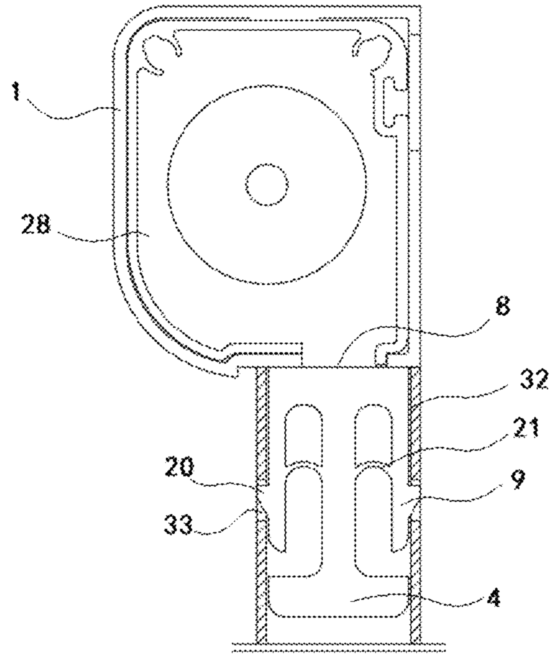
FIG. 5 is a schematic view of a connection state between the end cap and the screen channel (double spring locks)

As shown in FIGS. 3 to 5, the present invention discloses an adjustable retractable screen door. The first elongated spring lock 9 includes a locking projection 20. The locking projection 20 engages the first locking slot 33 for locking and connecting parts. The first elongated spring lock 9 may be configured on a single side or double sides as shown in FIG. 5. When the same material and specification are provided, compared with the first elongated spring locks 9 configured on double sides, the first elongated spring lock 9 configured on the single side is better in terms of maintaining the structural strength of the first guide leg 4 and guaranteeing the stability of a connection between the end cap 1 and the screen channel 32. The first elongated spring locks 9 configured on double sides are better in terms of a locking effect, and also have a problem of high unlocking difficulty. Particularly, when they are applied to the mounting of the retractable screen door 2, a side of the mounted retractable screen door 2 may be close to a door leaf of a sliding door, thereby increasing the unlocking difficulty of the first elongated spring lock 9 on this side. To sum up, the first elongated spring lock 9 configured on the single side is more practical. The first elongated spring lock 9 is configured on a side away from the door leaf of the sliding door.

In an embodiment, a spring stripe 21 is configured between the first elongated spring lock 9 and the first guide leg 4. The first elongated spring lock 9 is elastically connected to the first guide leg 4 through the spring stripe 21. At least one spring stripe 21 is provided.

Embodiment 3

Figure 2:
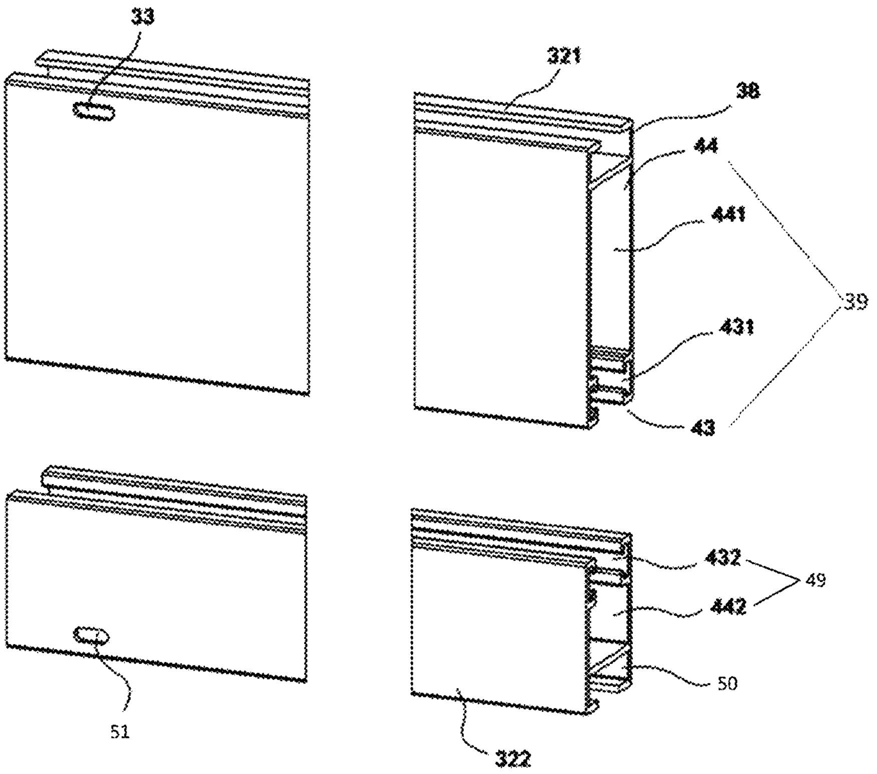
FIG. 2 is a schematic view of a screen channel.
Figure 6:
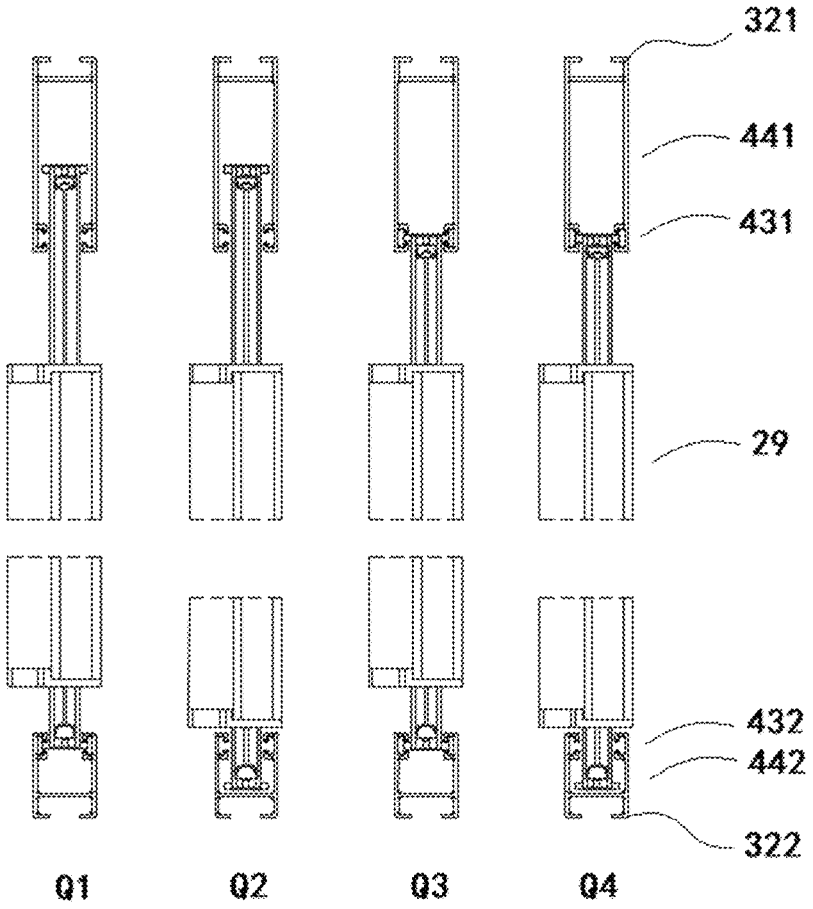
FIG. 6 is a schematic view of sliding fit between a handle slide body 40 and a handle slide channel 39 (embodiment 3)
Figure 7:
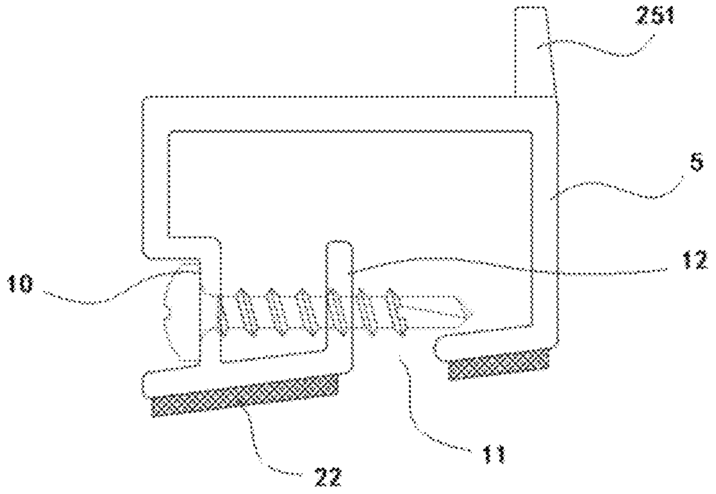
FIG. 7 is a sectional view of a lower mounting adapter.
Figure 8:
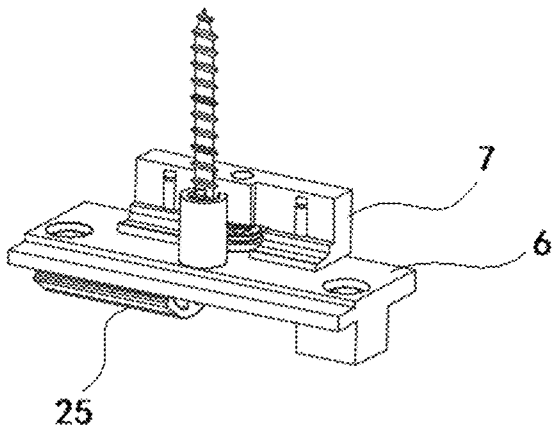
FIG. 8 is a three-dimensional view of an upper mounting adapter.
Figure 9:
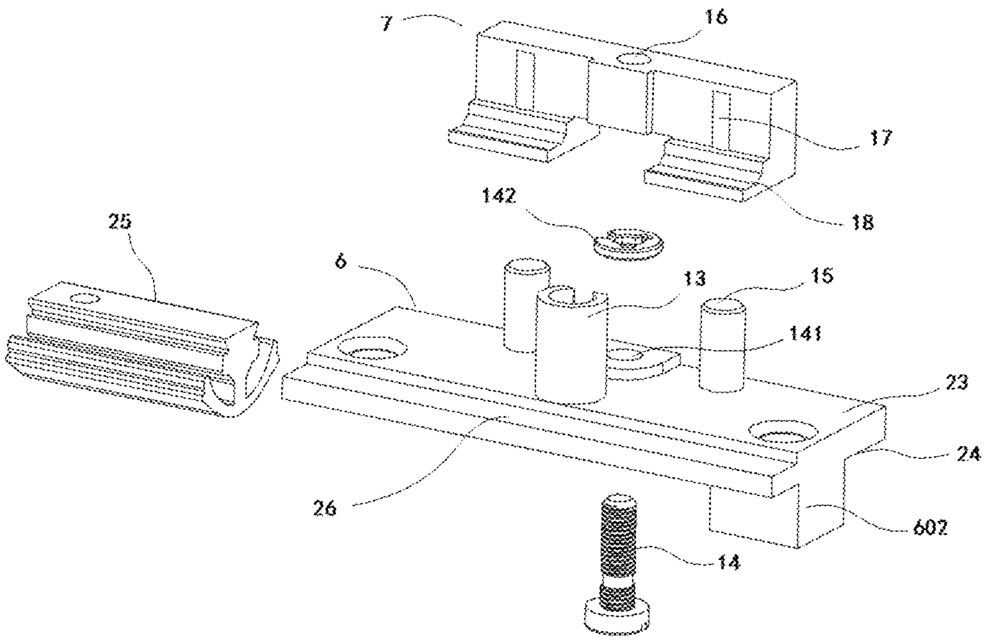
FIG. 9 is an exploded view of the upper mounting adapter.
Figure 10:
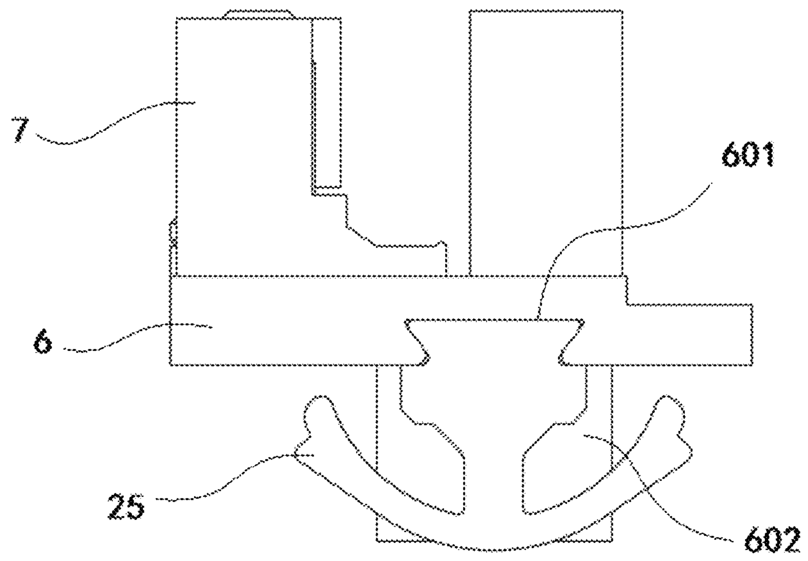
FIG. 10 is a side view of the upper mounting adapter (in a low-position state)
Figure 11:
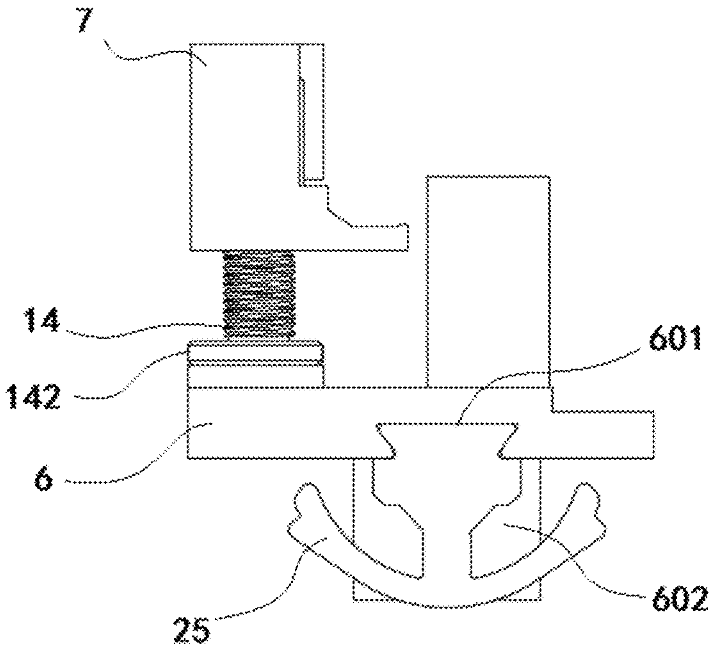
FIG. 11 is a side view of the upper mounting adapter (in a low-position state)
Figure 12:
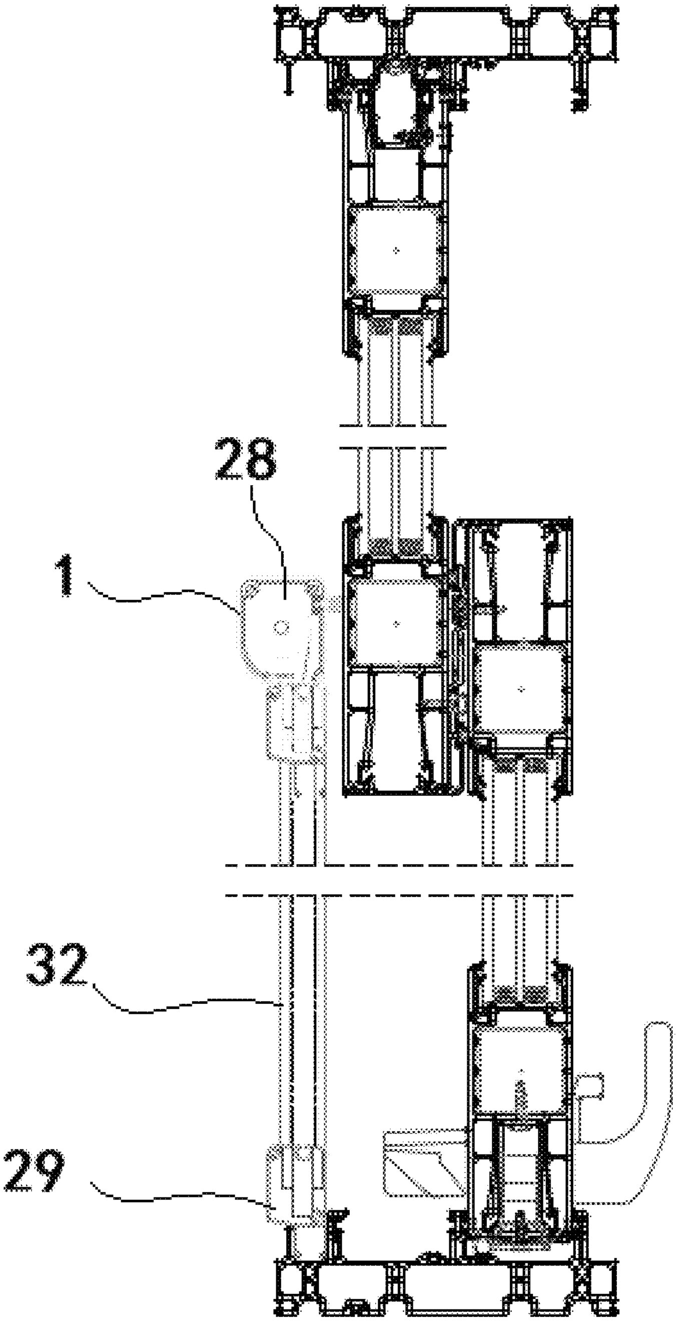
FIG. 12 is a cross-sectional view of a mounting state of the adjustable retractable screen door (mounted on a first sliding door)
Figure 13:
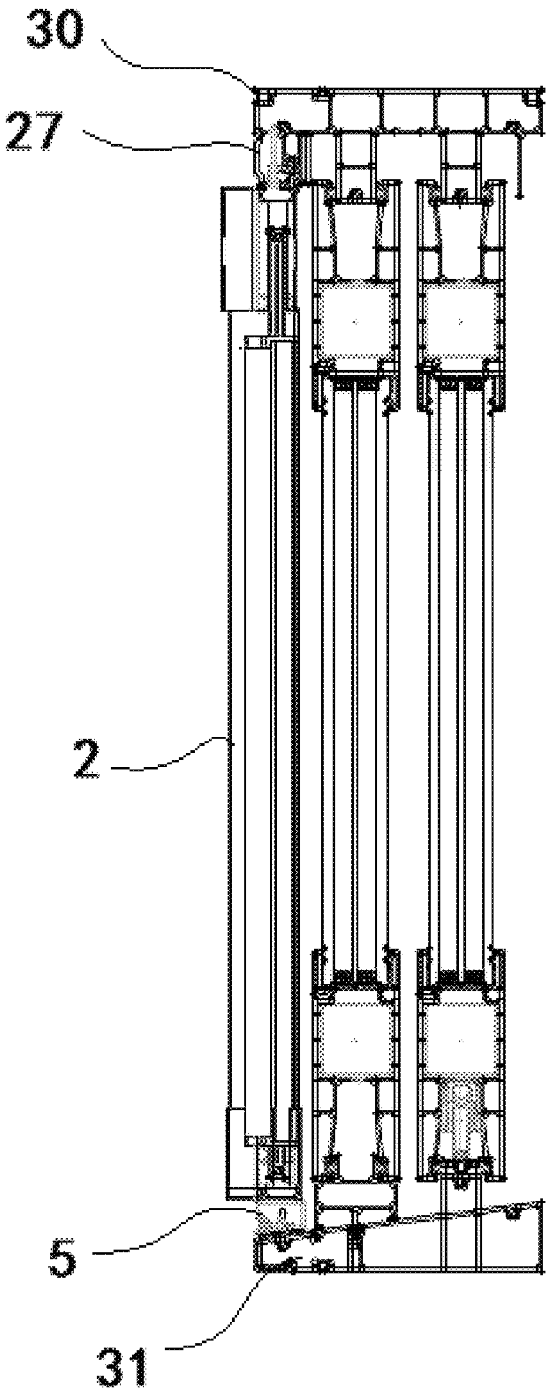
FIG. 13 is a longitudinal-sectional view of the mounting state of the adjustable retractable screen door (mounted on the first sliding door)
Figure 14:
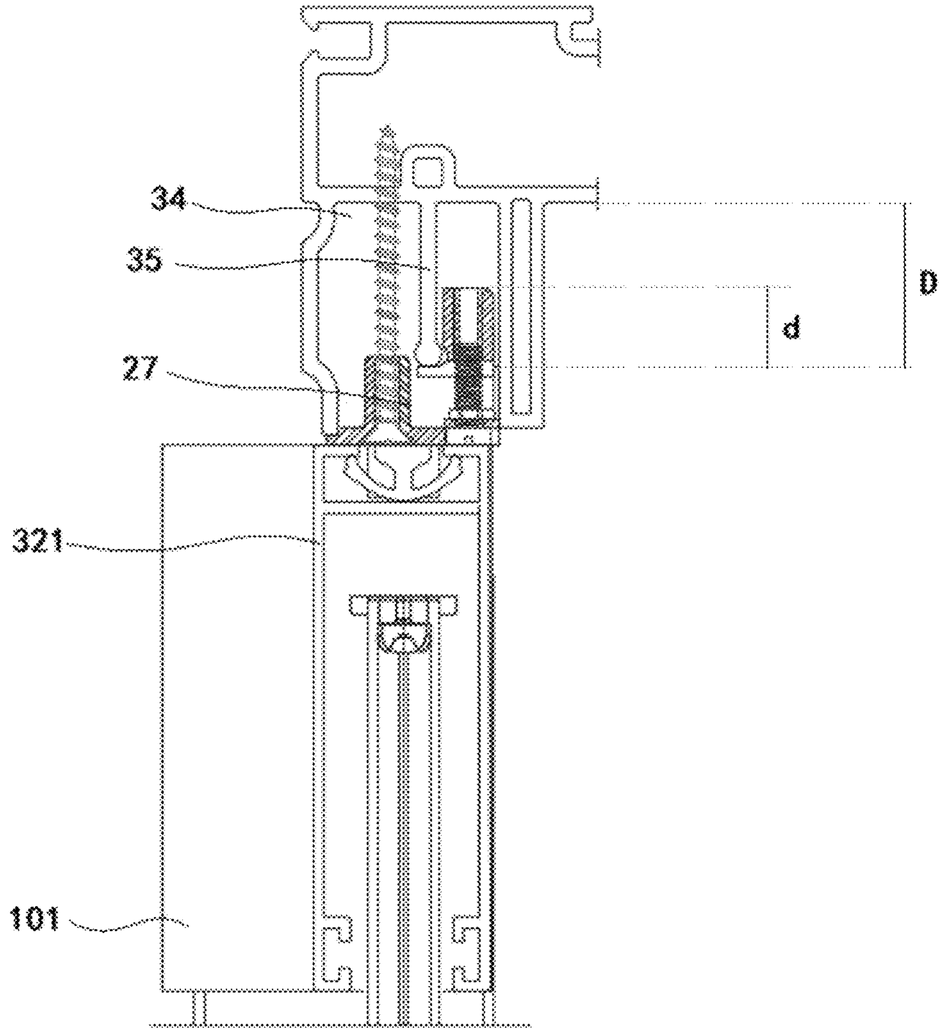
FIG. 14 is an enlarged view of a connection state between an upper end of the retractable screen door and a door head jamb in FIG. 13.
Figure 15:
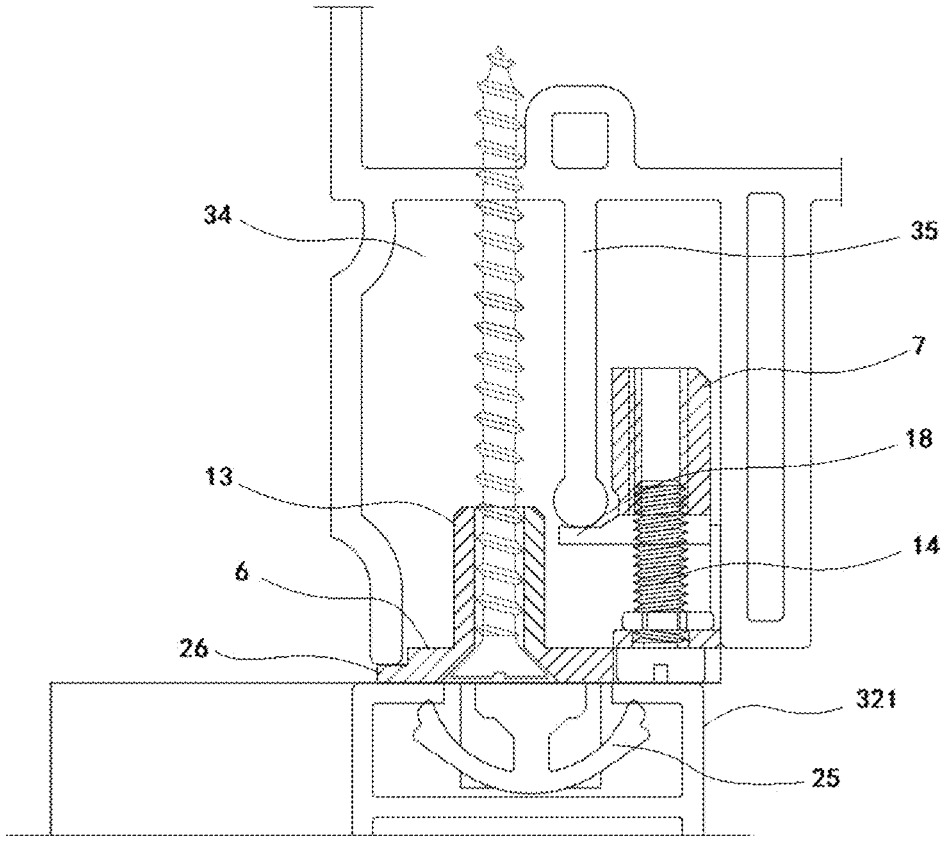
FIG. 15 is an enlarged view of a connection state between an upper mounting adapter and the door head jamb in FIG. 14.
Figure 16:
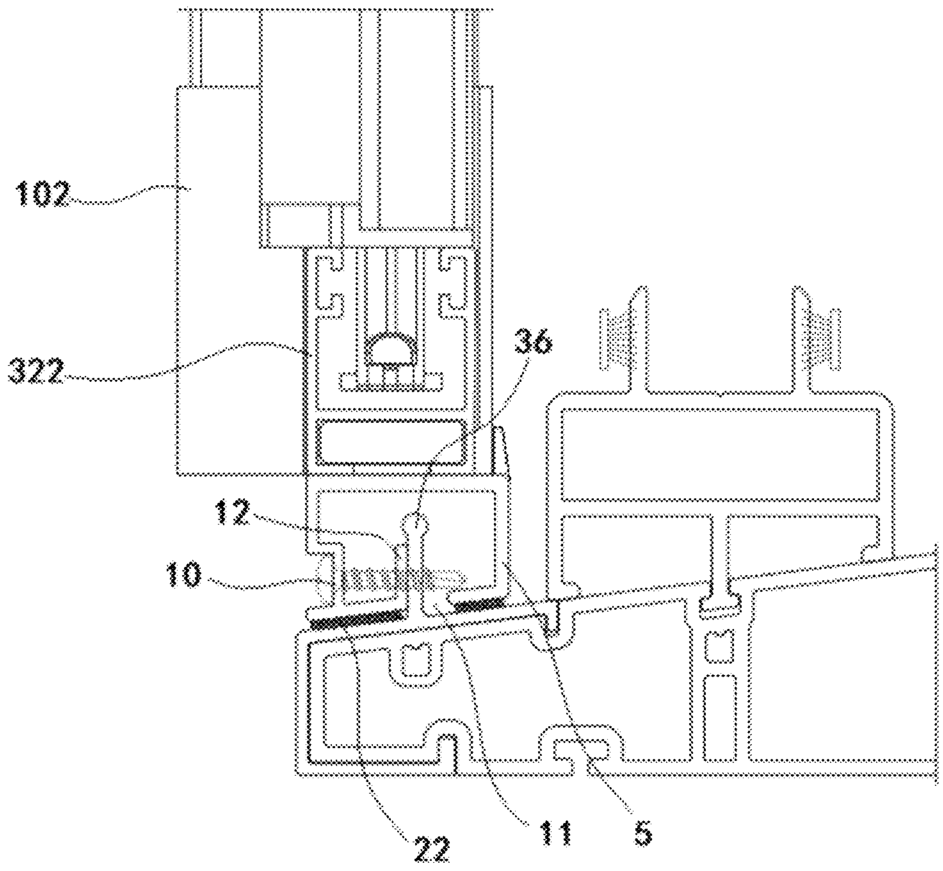
FIG. 16 is an enlarged view of a connection state between a lower end of the retractable screen door and a door sill in FIG. 13.
Figure 17:
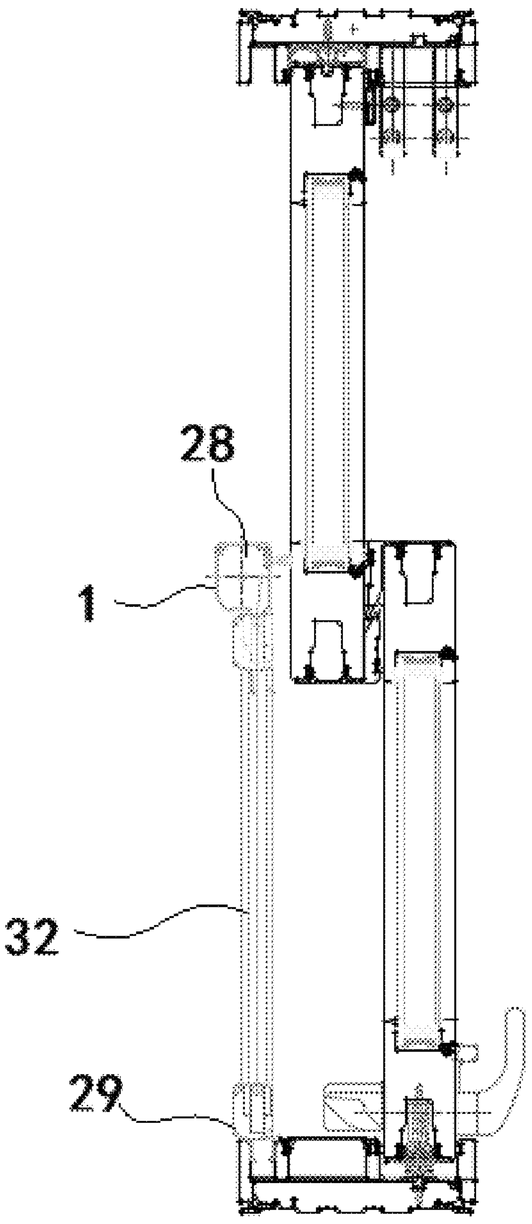
FIG. 17 is a cross-sectional view of a mounting state of the adjustable retractable screen door (mounted on a second sliding door)
Figure 18:
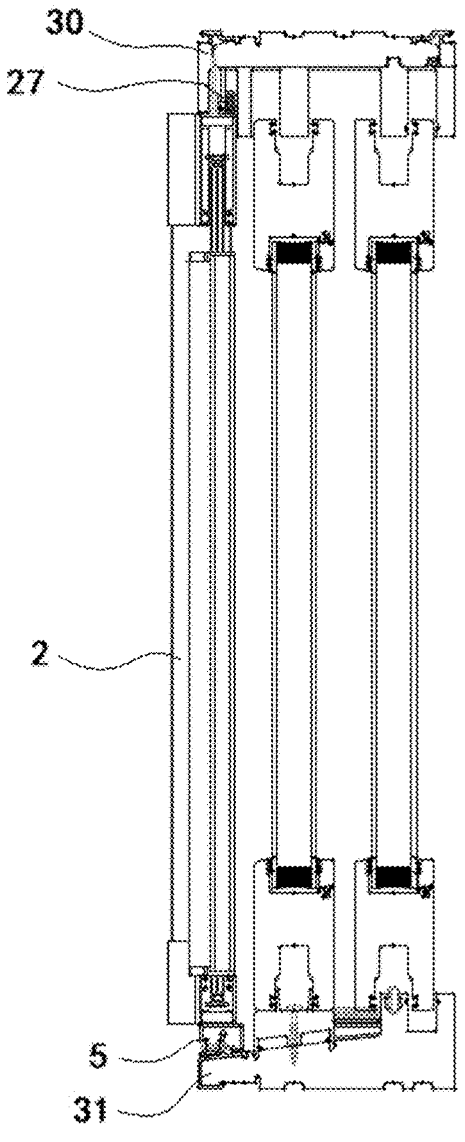
FIG. 18 is a longitudinal-sectional view of the mounting state of the adjustable retractable screen door (mounted on the second sliding door)
Figure 19:
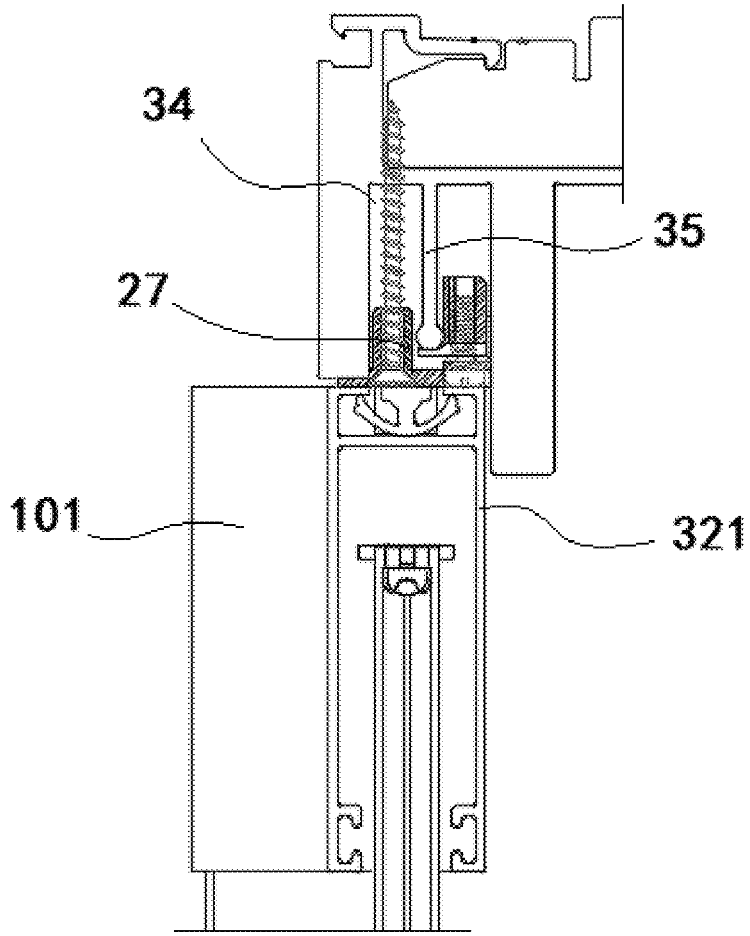
FIG. 19 is an enlarged view of a connection state between the upper end of the retractable screen door and the door head jamb in FIG. 18.
Figure 20:
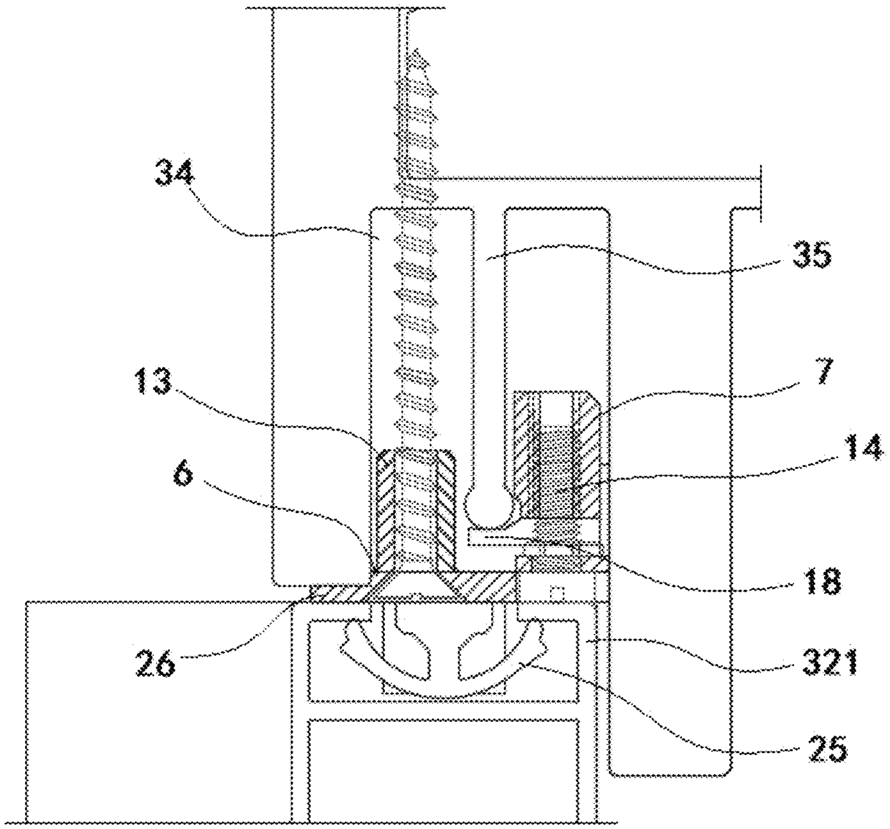
FIG. 20 is an enlarged view of the connection state between the upper mounting adapter and the door head jamb in FIG. 19.
Figure 21:
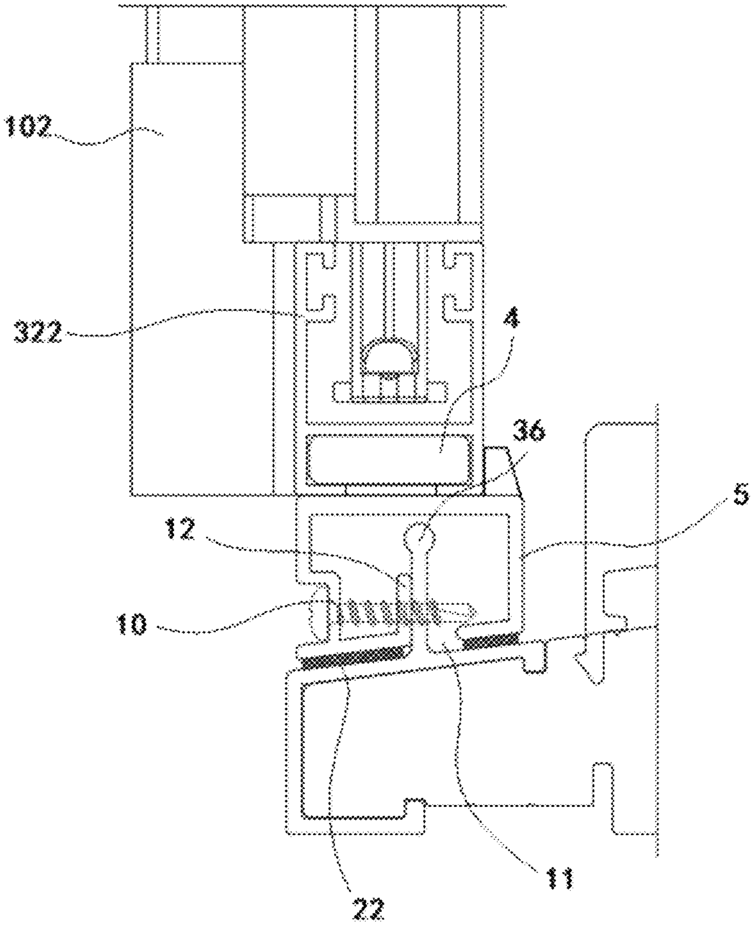
FIG. 21 is an enlarged view of the connection state between the lower end of the retractable screen door and the door sill in FIG. 18.
Figure 22:
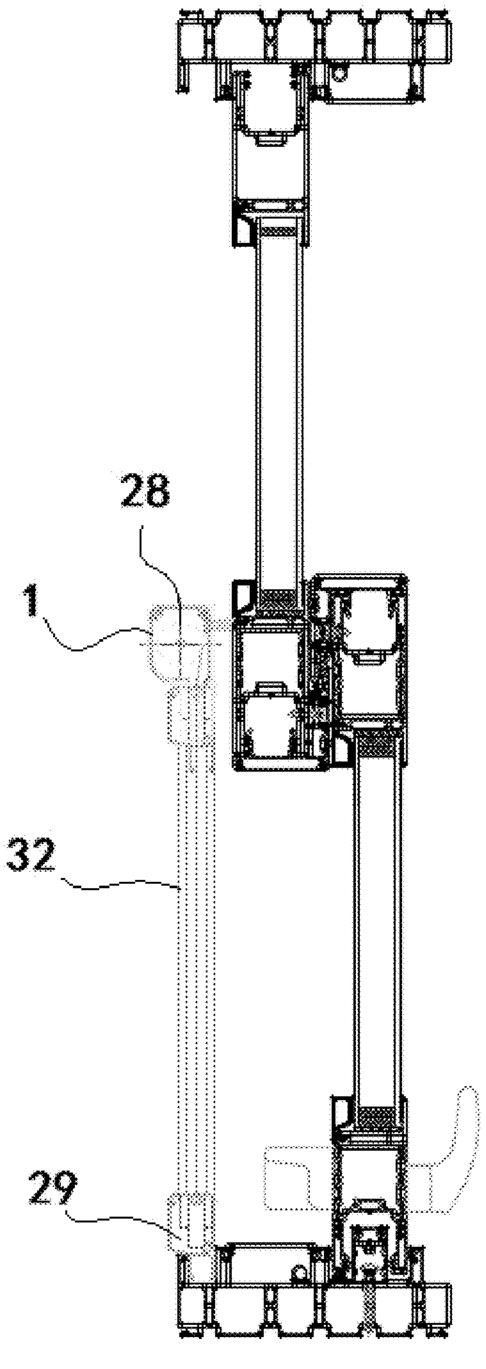
FIG. 22 is a cross-sectional view of a mounting state of the adjustable retractable screen door (mounted on a third sliding door)
Figure 23:
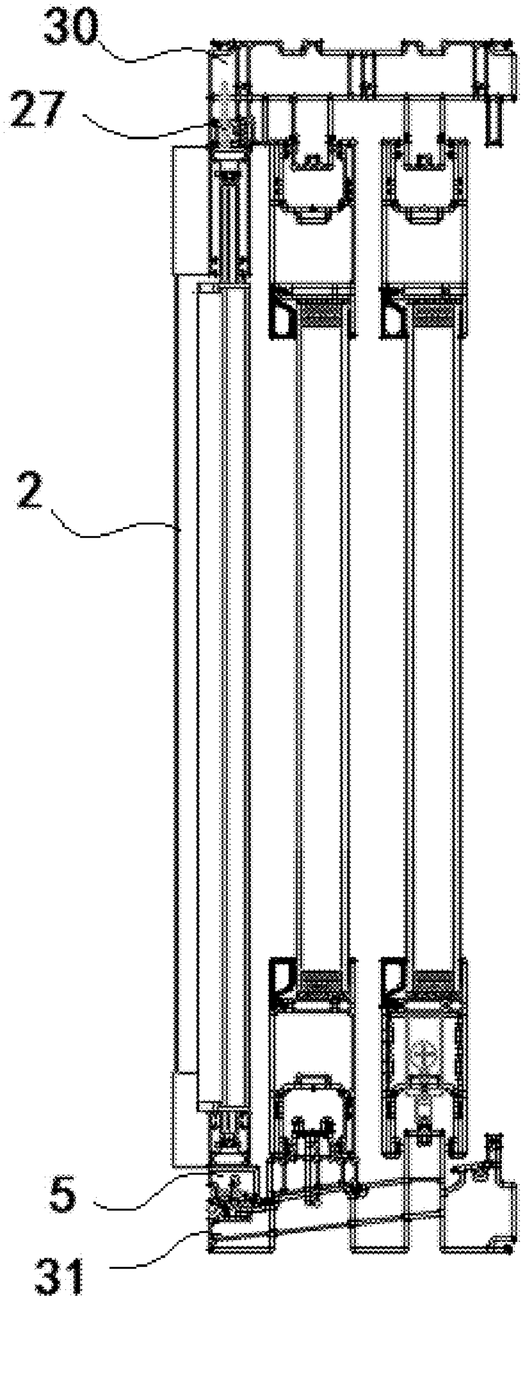
FIG. 23 is a longitudinal-sectional view of the mounting state of the adjustable retractable screen door (mounted on the third sliding door)
Figure 24:
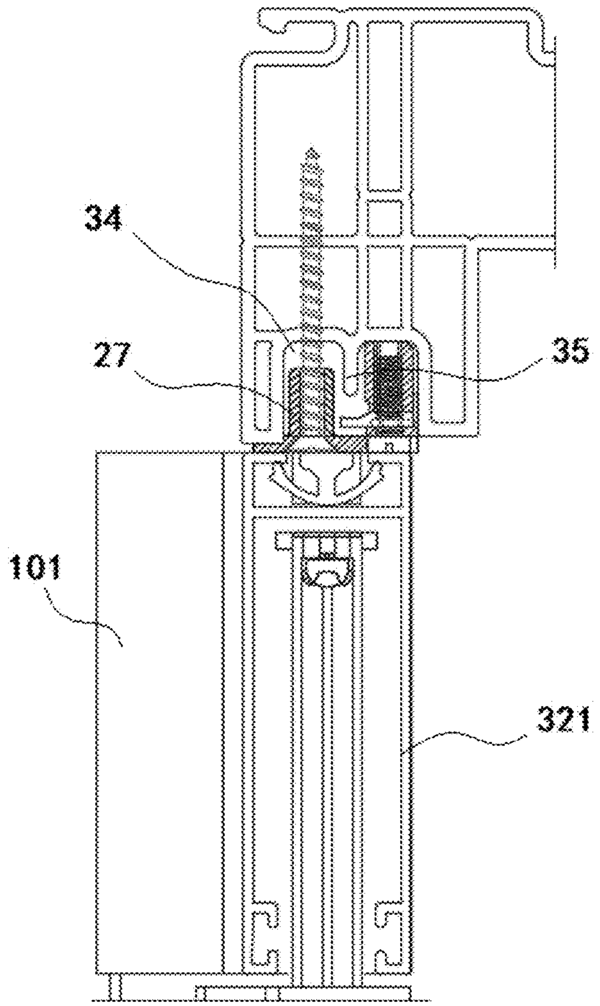
FIG. 24 is an enlarged view of the connection state between the upper end of the retractable screen door and the door head jamb in FIG. 23.
Figure 25:
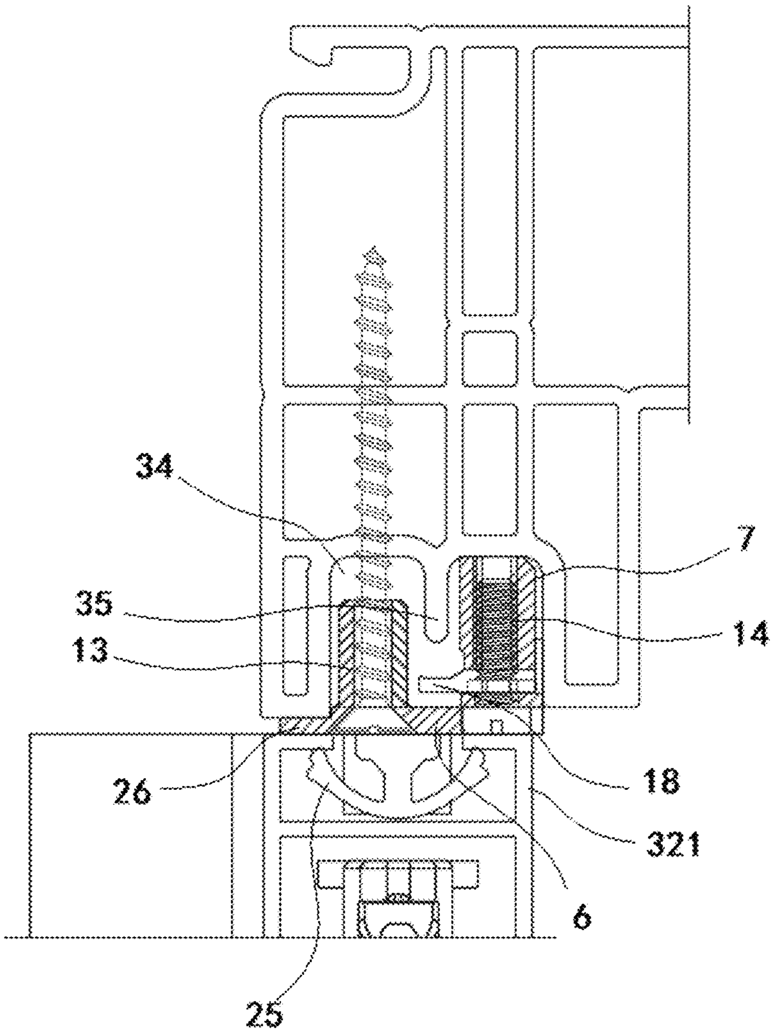
FIG. 25 is an enlarged view of the connection state between the upper mounting adapter and the door head jamb in FIG. 24.
Figure 26:
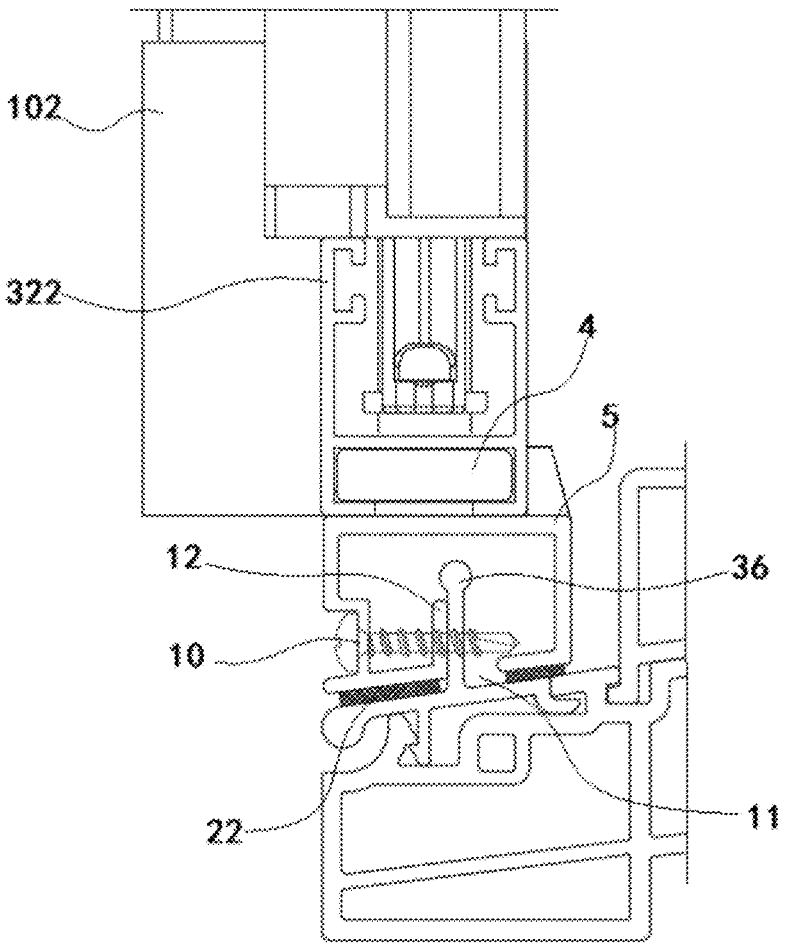
FIG. 26 is an enlarged view of the connection state between the lower end of the retractable screen door and the door sill in FIG. 23.
Figure 27:
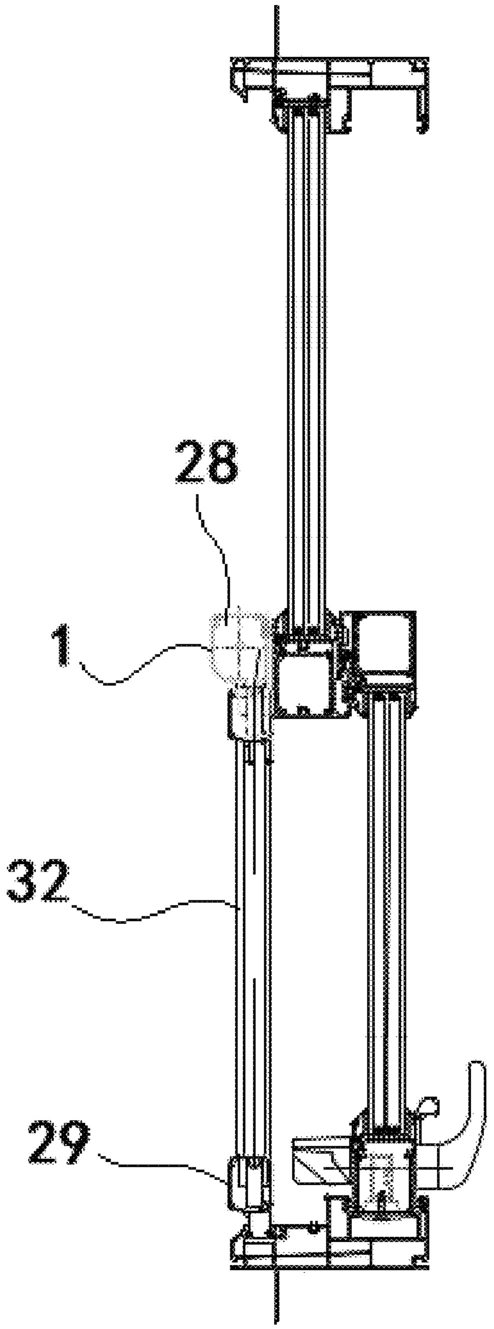
FIG. 27 is a cross-sectional view of a mounting state of the adjustable retractable screen door (mounted on a fourth sliding door)
Figure 28:
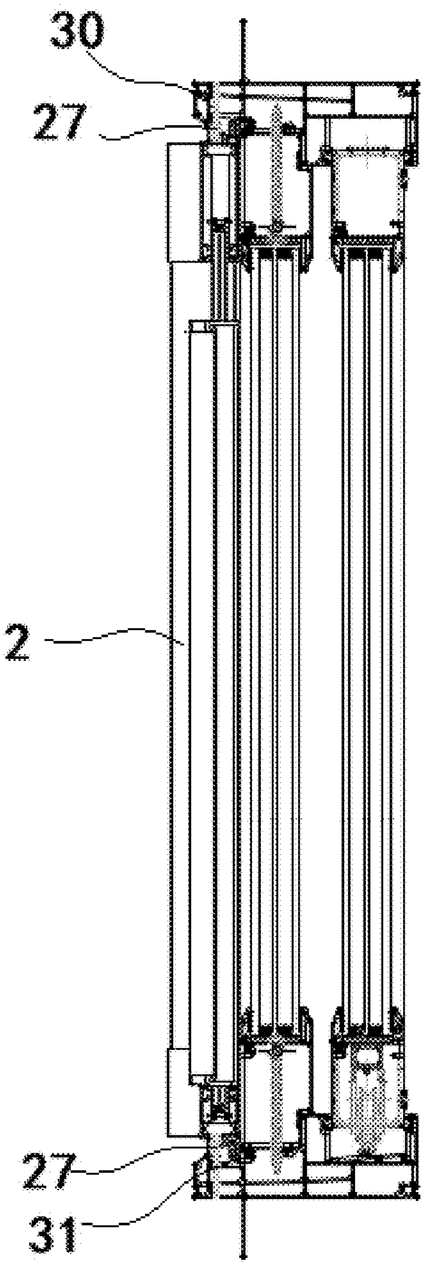
FIG. 28 is a longitudinal-sectional view of the mounting state of the adjustable retractable screen door (mounted on the fourth sliding door)
Figure 29:
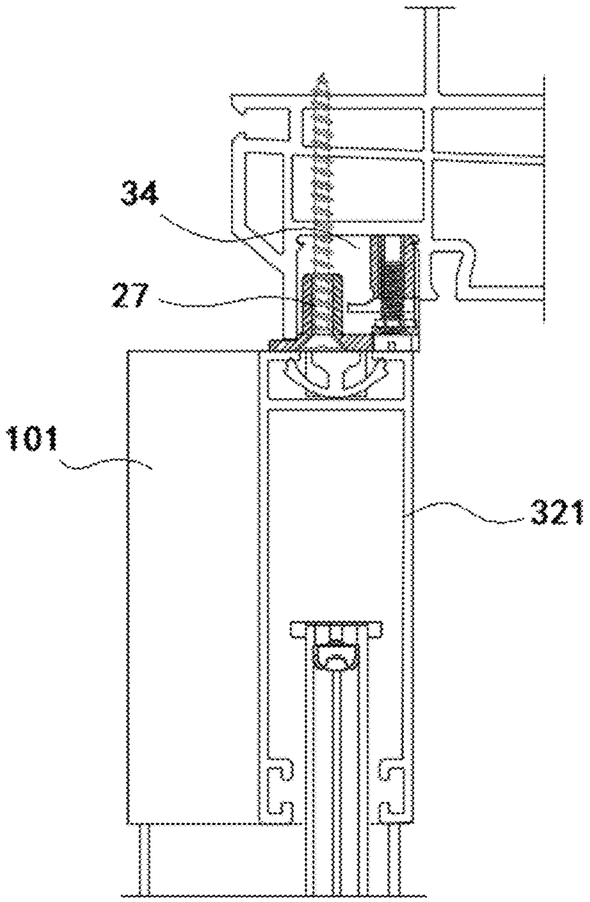
FIG. 29 is an enlarged view of the connection state between the upper end of the retractable screen door and the door head jamb in FIG. 28.
Figure 30:
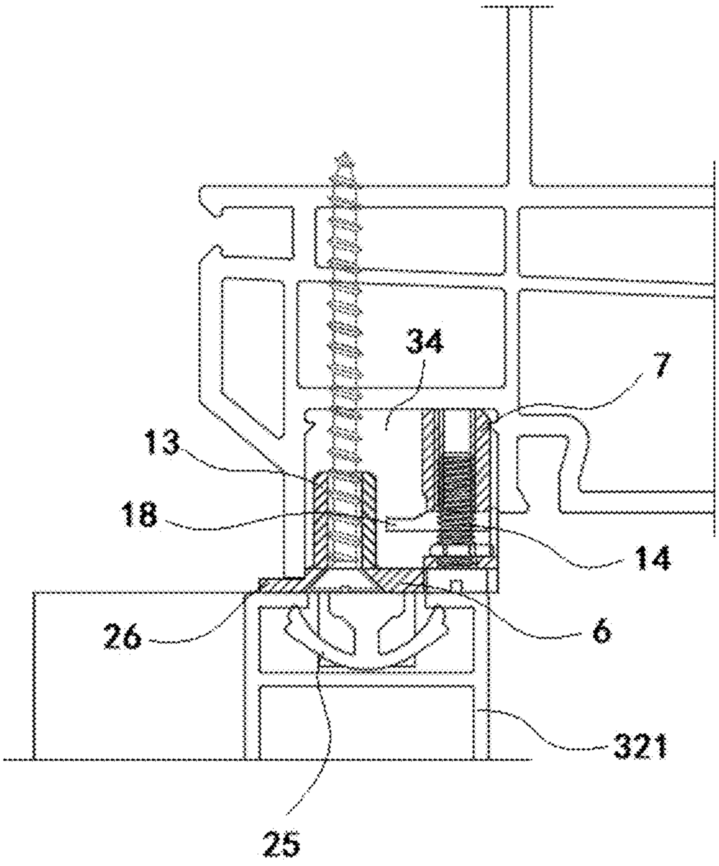
FIG. 30 is an enlarged view of the connection state between the upper mounting adapter and the door head jamb in FIG. 29.
Figure 31:
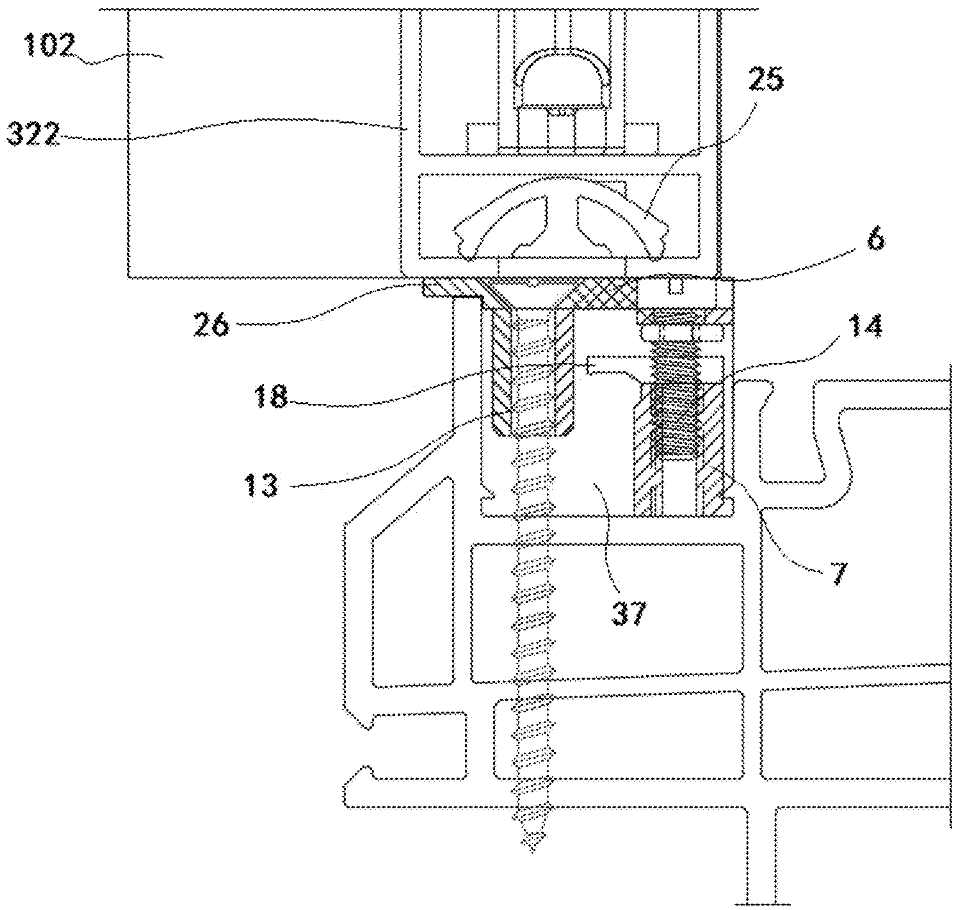
FIG. 31 is an enlarged view of the connection state between the lower end of the retractable screen door and the door sill in FIG. 28.
Figure 32:
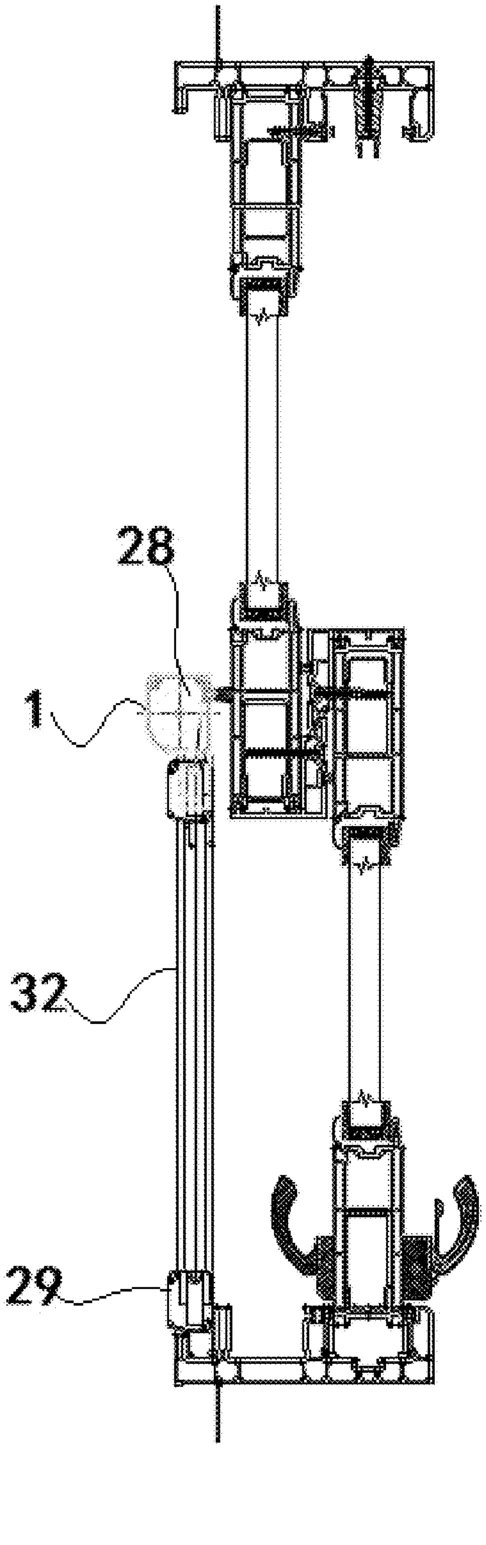
FIG. 32 is a cross-sectional view of a mounting state of the adjustable retractable screen door (mounted on a fifth sliding door)
Figure 33:
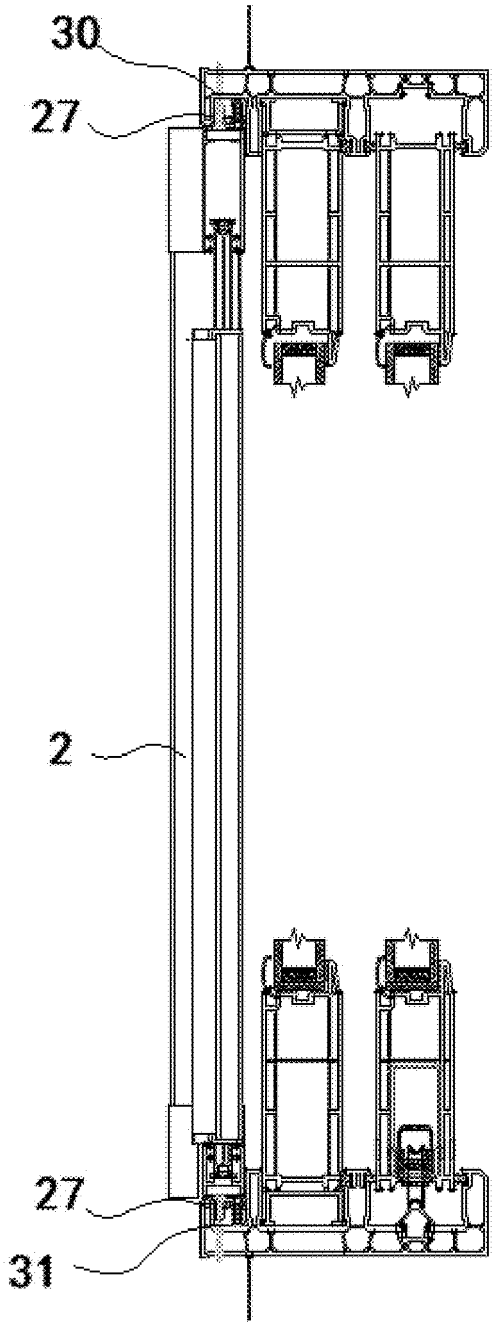
FIG. 33 is a longitudinal-sectional view of the mounting state of the adjustable retractable screen door (mounted on the fifth sliding door)
Figure 34:
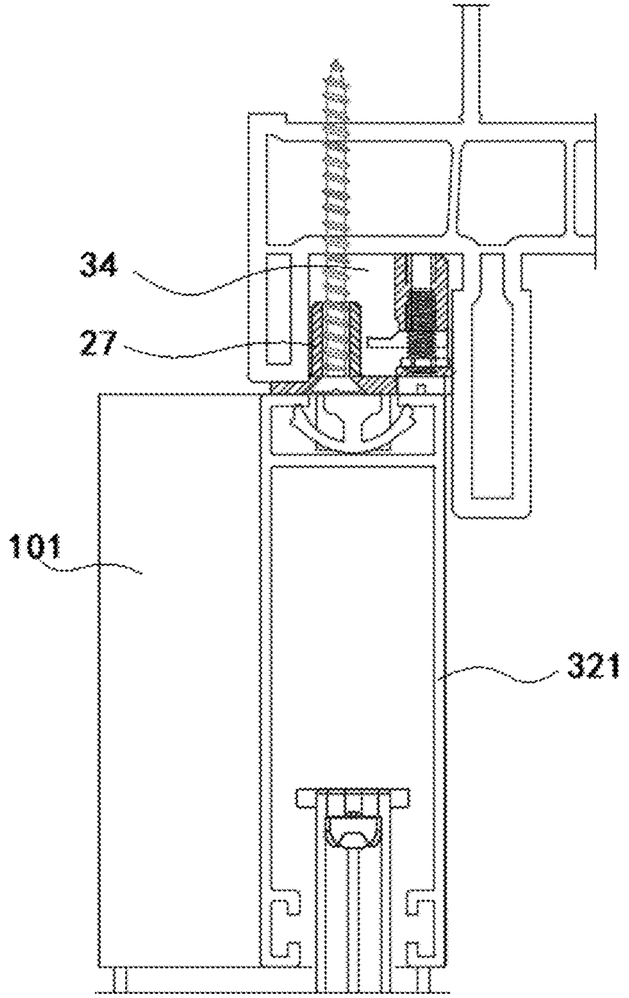
FIG. 34 is an enlarged view of the connection state between the upper end of the retractable screen door and the door head jamb in FIG. 33.
Figure 35:
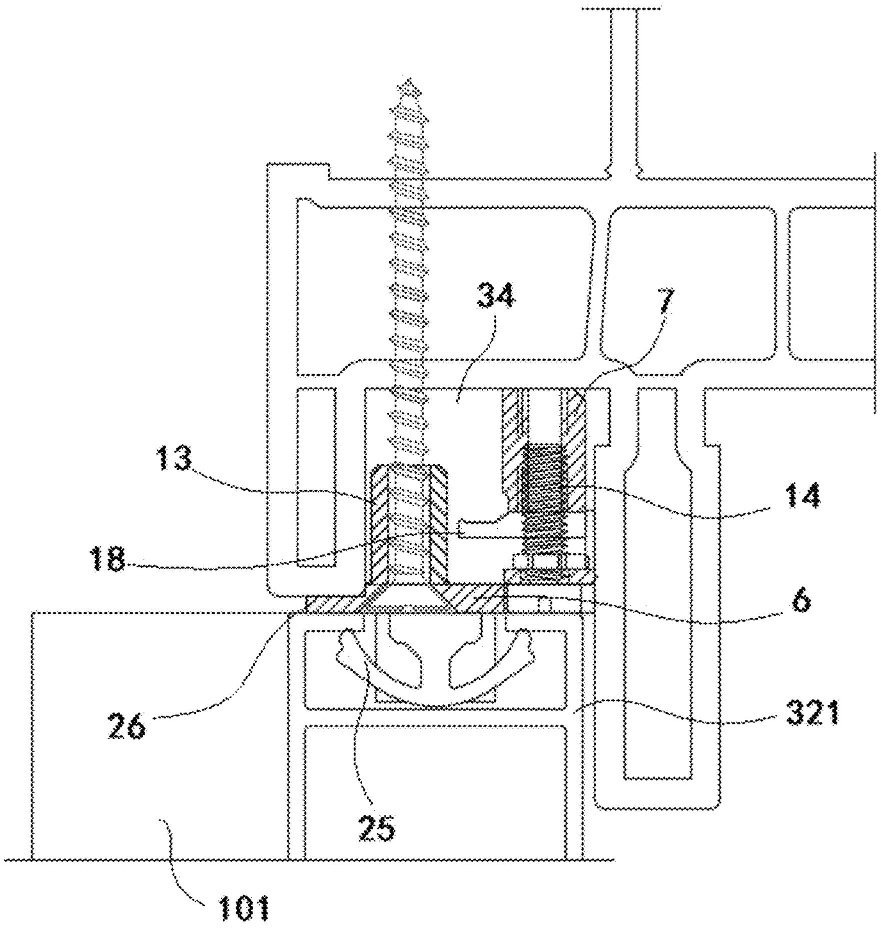
FIG. 35 is an enlarged view of the connection state between the upper mounting adapter and the door head jamb in FIG. 34.
Figure 36:
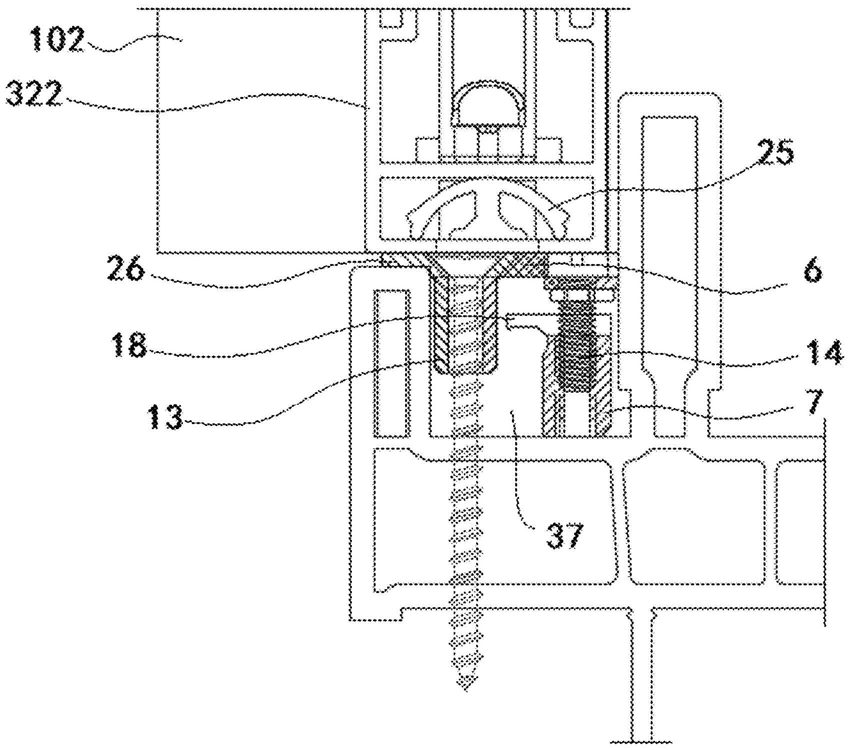
FIG. 36 is an enlarged view of the connection state between the lower end of the retractable screen door and the door sill in FIG. 33.
Figure 37:
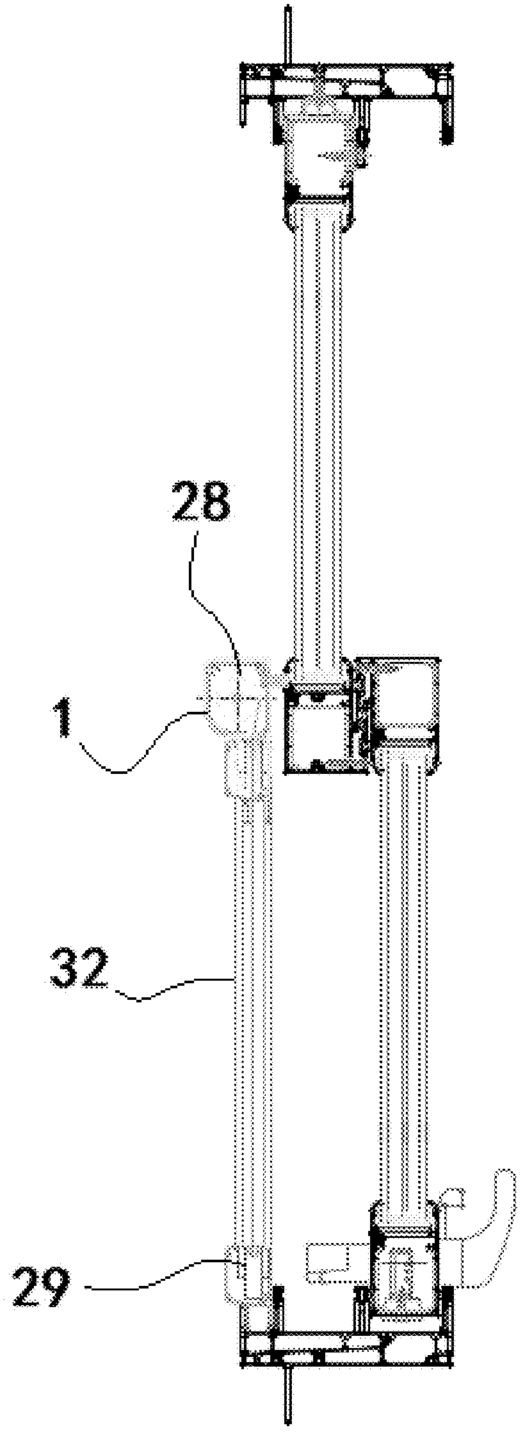
FIG. 37 is a cross-sectional view of a mounting state of the adjustable retractable screen door (mounted on a sixth sliding door)
Figure 38:
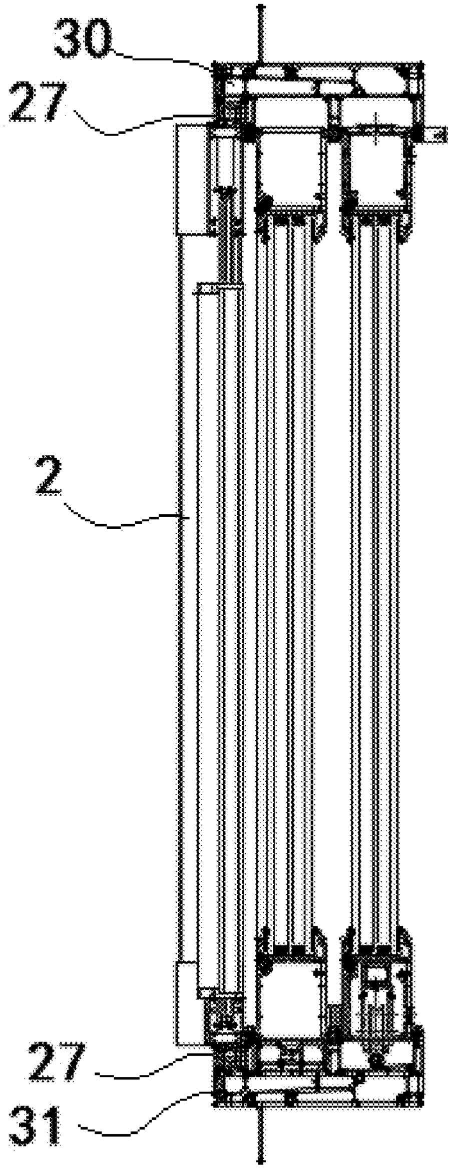
FIG. 38 is a longitudinal-sectional view of the mounting state of the adjustable retractable screen door (mounted on the sixth sliding door)
Figure 39:
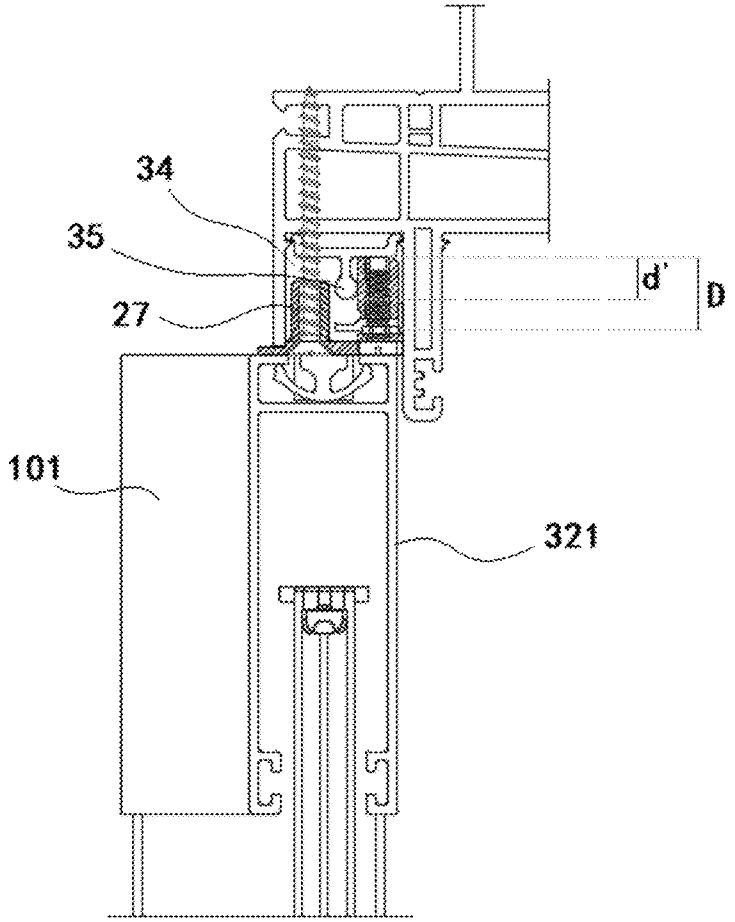
FIG. 39 is an enlarged view of the connection state between the upper end of the retractable screen door and the door head jamb in FIG. 38.
Figure 40:
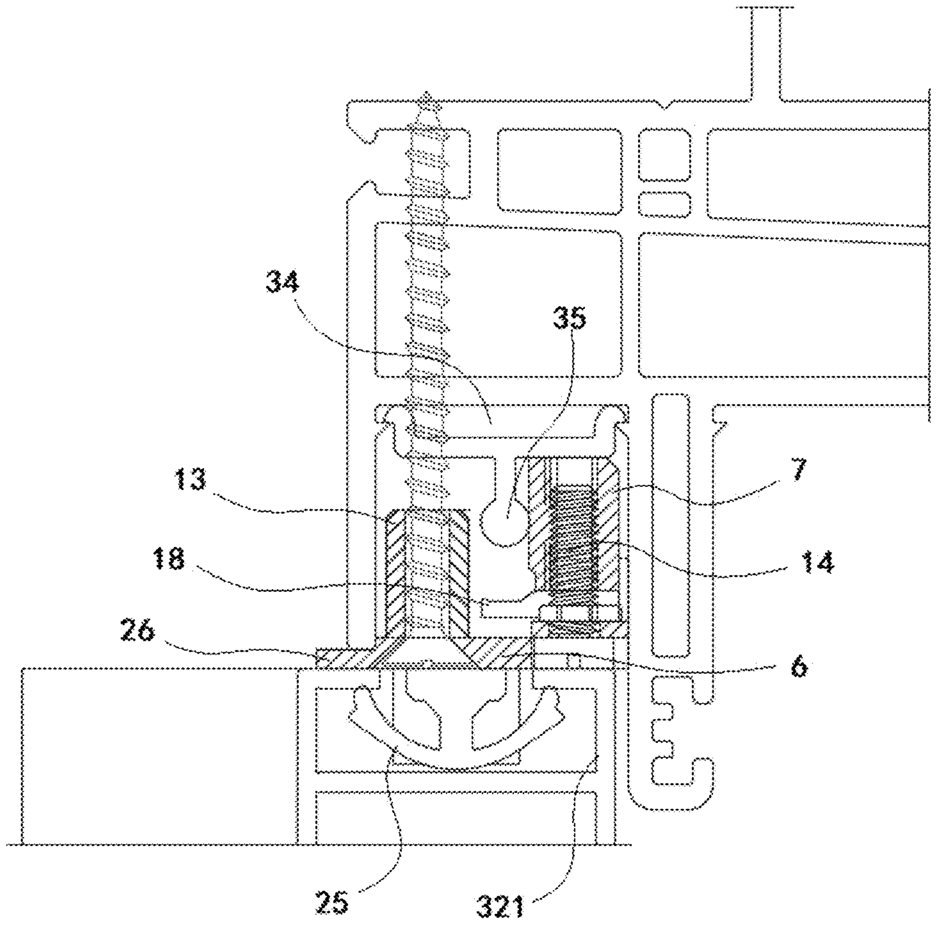
FIG. 40 is an enlarged view of the connection state between the upper mounting adapter and the door head jamb in FIG. 39.
Figure 41:
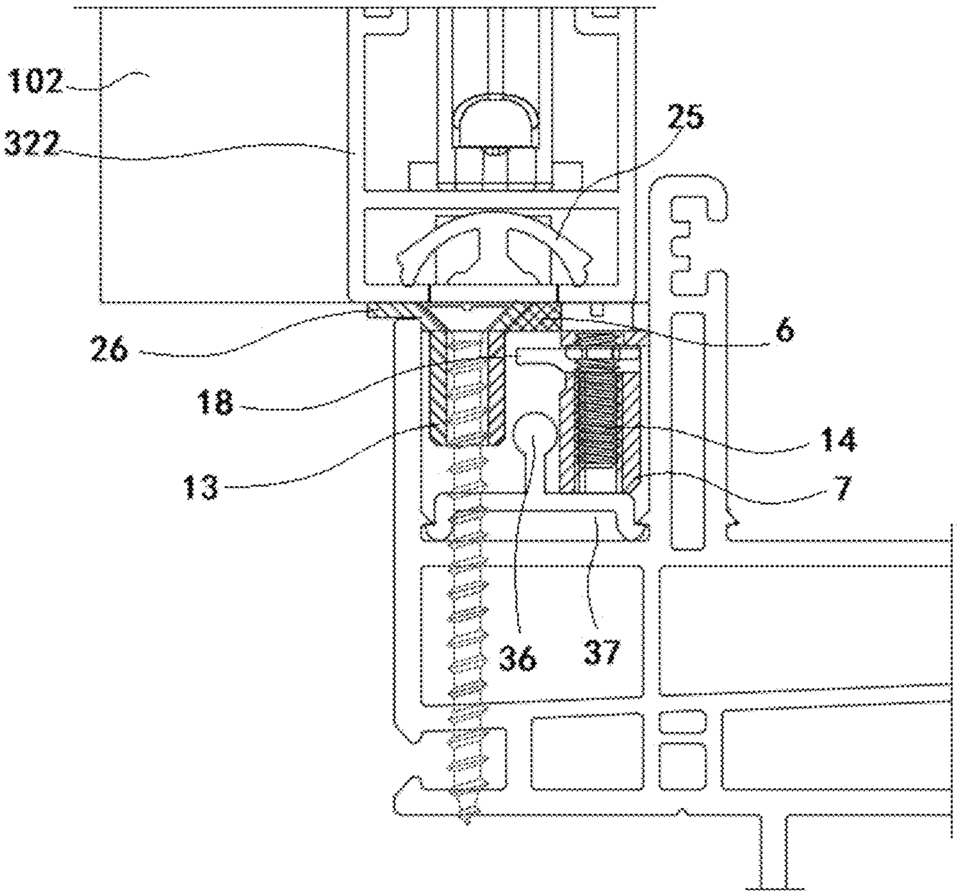
FIG. 41 is an enlarged view of the connection state between the lower end of the retractable screen door and the door sill in FIG. 38.

As shown in FIGS. 1, 2 and 6, the present invention discloses an adjustable retractable screen door having an adjustable function. A scheme for mounting the retractable screen door 2 can be adjusted according to a length specification of the retractable screen door 2, so that the purpose that a sliding door frame is adapted is achieved. A pair of the end caps 1 includes an upper end cap 101 which sleeves an upper end of the screen housing 28 and a lower end cap 102 which sleeves a lower end of the screen housing 28. The screen channel 32 includes a top screen channel 321 which is connected to the upper end cap 101 and a lower screen channel 322 which is connected to the lower end cap 102. The first handle slide channel 39 includes a screen slide opening slot 43 and a slide channel 44 adjacent to the screen slide opening slot 43. A height of the screen slide opening slot 43 along a vertical direction is less than a height of the slide channel 44 along a vertical direction. The handle slide body 40 is in sliding fit with one of the screen slide opening slots 43 and with the slide channel 44.

The handle slide body 40 which is located on an upper end of the handle housing 29 is a handle housing top slide 41. The handle slide body 40 which is located on a lower end of the handle housing 29 is a handle housing lower slide 42. The screen slide opening slot 43 which is located on the top screen channel 321 is an upper weatherstrip slot 431. The slide channel 44 which is located on the top screen channel 321 is a top slide channel 441. The screen slide opening slot 43 which is located on the lower screen channel 322 is a lower weatherstrip slot 432. The slide channel 44 which is located on the lower screen channel 322 is a lower slide channel 442. Four schemes (as shown in FIG. 6) are proposed for a way of sliding fit between the handle slide body 40 and the first handle slide channel 39 and are specifically described as follows.

Q1: The handle housing top slide 41 is slidably configured on the top slide channel 441. The handle housing lower slide 42 is slidably configured on the lower weatherstrip slot 432.

Q2: The handle housing top slide 41 is slidably configured on the top slide channel 441. The handle housing lower slide 42 is slidably configured on the lower slide channel 442.

Q3: The handle housing top slide 41 is slidably configured on the upper weatherstrip slot 431. The handle housing lower slide 42 is slidably configured on the lower weatherstrip slot 432.

Q4: The handle housing top slide 41 is slidably configured on the upper weatherstrip slot 431. The handle housing lower slide 42 is slidably configured on the lower slide channel 442.

In these four schemes, both of the upper end cap 101 and the lower end cap 102 cannot be separated from the upper and lower ends of the screen housing 28.

When the height of the sliding door frame is invariable, these schemes can be selected according to a vertical length condition of the retractable screen door 2. When the vertical length of the retractable screen door 2 is largest-equal to a vertical length between the upper weatherstrip slot 431 and the lower weatherstrip slot 432, and marked as d1)—the scheme Q3 is appropriate. When the vertical length of the retractable screen door 2 is largest-less than or equal to a vertical length between the top slide channel 441 and the lower slide channel 442, and greater than a vertical length between the top slide channel 441 and the lower weatherstrip slot 432 or a vertical length between the upper weatherstrip slot 431 and the lower slide channel 442, and marked as d2—the scheme Q2 is appropriate. When the vertical length of the retractable screen door 2 is moderate-greater than a vertical length between the upper weatherstrip slot 431 and the lower weatherstrip slot 432, and less than or equal to a vertical length between the top slide channel 441 and the lower weatherstrip slot 432 or a vertical length between the upper weatherstrip slot 431 and the lower slide channel 442, and marked as d3-either the scheme Q1 or Q4 is appropriate.

When the vertical length of the retractable screen door 2 is definite, by selecting the way of sliding fit between the handle slide body 40 and the first handle slide channel 39, the adjustable retractable screen door can be adjusted in vertical length so as to adapt to sliding doors with different door frame heights.

Embodiment 4

As shown in FIGS. 7 to 11, to improve the universality of the adjustable retractable screen door in the present invention and make it adapt to most of existing sliding doors, the present invention discloses a mounting accessory for the adjustable retractable screen door. By using this accessory, the adjustable retractable screen door in the present invention can be mounted on most of existing sliding door frames, thereby improving the universality of the adjustable retractable screen door in embodiment 1, embodiment 2 and embodiment 3 and saving the cost for a user to replace a sliding door.

The mounting accessory includes an upper mounting adapter 27 (FIG. 1) and a lower mounting adapter 5 (FIG. 1). The upper mounting adapter 27 includes an upper mounting block 6 and an adjustment block 7 which cooperates with the upper mounting block 6 and a connector 25. The upper mounting block 6 includes a screw boss 13, an adjustment screw 14 and a locator guide 15. The adjustment block 7 includes a threaded hole 16 and a guide bump 17 which are inserted into and are in clearance fit with the locator guide 15. The adjustment block 7 is mounted on the upper mounting block 6 through the locator guide 15 and the guide bump 17. The upper mounting block 6 includes a clearance hole 141. The adjustment screw 14, which penetrates into the clearance hole 141, is rotatably configured on the upper mounting block 6 through a retainer clip 142. The adjustment screw 14, which is in thread fit with the threaded hole 16, rotates itself to drive the adjustment block 7 which is caused to get close to or move away from the upper mounting block 6 so that a height is adjusted. The lower mounting adapter 5 has a quadrangular cross section, a horizontal upper end surface and an obliquely-disposed lower end surface. The lower mounting adapter 5 includes a screw channel 10 on its horizontal side and an elongated gap 11 on its lower end surface. A side of the elongated gap 11 includes a stop leg 12.

The upper mounting block 6 further includes a connection slot 601 and an alignment tab 602. The connector 25 is in clamping connection with the upper mounting block 6 through the connection slot 601. The upper mounting block 6 includes a mounting block top surface 23 and a mount surface 24. The screw boss 13, the adjustment screw 14 and the locator guide 15 protrude out of the mounting block top surface 23. The screw boss 13 includes a columnar clearance hole. The locator guide 15 is columnar. The guide bump 17 and the locator guide 15 cooperate in their shapes and are in clearance fit. The connection slot 601 and the alignment tab 602 protrude out of the mount surface 24. The connector 25 is mounted on the mount surface 24 and is slidably connected to the first end cap connection channel 38 in the screen channel 32. The alignment tab 602 is in clearance fit with the first end cap connection channel 38 to attain a slidable connection between the upper mounting adapter and the screen channel.

A side of the adjustment block 7 is connected with a support leg 18. A side of the upper mounting block 6 includes a step. This step is an adjustment block step 26. A lower end surface of the lower mounting adapter 5 includes an elongated double-sided tape 22. This elongated double-sided tape 22 is a foam gasket or a rubber gasket. A side of an upper end surface of the lower mounting adapter 5 includes a lower mounting adapter stop 251. The lower mounting adapter stop 251 protrudes out of the upper end surface of the lower mounting adapter 5.

The mounting accessory in the present invention is configured to adaptively mount the adjustable retractable screen door and an existing sliding door. The upper mounting adapter 27 is configured to position and fixedly connect the top screen channel 321 and a door head jamb 30 of a sliding door frame and may also be configured to position and fixedly connect the lower screen channel 322 and a door sill 31 of the sliding door frame. The lower mounting adapter 5 is configured to position and fixedly connect the lower screen channel 322 and the door sill 31 of the sliding door frame.

The lower mounting adapter stop 251 is configured to position a mounting position of the adjustable retractable screen door, so that the mounting precision of the adjustable retractable screen door can be improved. The mounting stability thereof can be guaranteed. The elongated double-sided tape 22 is configured to compensate a mounting angle when the lower mounting adapter 5 is mounted, so that it can be ensured that the upper end surface of the lower mounting adapter 5 is horizontal after it is mounted. A cross section of the support leg 18 is shaped like a circular arc so as to cooperate with a track end surface of a screen sliding rail which may be configured on the existing sliding door frame.

The mounting accessory in the present invention is configured to adaptively mount the adjustable retractable screen door and an existing sliding door. The upper mounting adapter 27 is configured to position and fixedly connect the top screen channel 321 and a door head jamb 30 of a sliding door frame and may also be configured to position and fixedly connect the lower screen channel 322 and a door sill 31 of the sliding door frame. The lower mounting adapter 5 is configured to position and fixedly connect the lower screen channel 322 and the door sill 31 of the sliding door frame.

The connector 25 and the lower mounting adapter stop 251 are configured to position a mounting position of the adjustable retractable screen door, so that the mounting precision of the adjustable retractable screen door can be improved. The mounting stability thereof can be guaranteed. The elongated double-sided tape 22 is configured to compensate a mounting angle when the lower mounting adapter 5 is mounted, so that it can be ensured that the upper end surface of the lower mounting adapter 5 is horizontal after it is mounted. A cross section of the support leg 18 is shaped like a circular arc so as to cooperate with a track end surface of a screen sliding rail which may be configured on the existing sliding door frame.

Embodiment 5

As shown in FIGS. 12 to 41, based on the technical solution disclosed in the embodiment 4, in order to better describe an effect that the mounting accessory improves the adaptive mounting direction of the adjustable retractable screen door, six existing sliding doors on the market have been selected. A mounting method for the mounting accessory for each of them will be described.

Each of the above-mentioned six sliding doors includes a sliding door frame. The sliding door frame includes a door head jamb 30 and a door sill 31. For facilitating distinguishing, the above-mentioned six sliding doors are respectively defined as a first sliding door (as shown in FIGS. 12 to 16), a second sliding door (as shown in FIGS. 17 to 21), a third sliding door (as shown in FIGS. 22 to 26), a fourth sliding door (as shown in FIGS. 27 to 31), a fifth sliding door (as shown in FIGS. 32 to 36) and a sixth sliding door (as shown in FIGS. 37 to 41). The door head jamb 30 of each of the first sliding door, the second sliding door, the third sliding door, the fourth sliding door, the fifth sliding door and the sixth sliding door is provided with a head jamb screen track channel 34. In addition, the head jamb screen track channel 34 in each of the first sliding door, the second sliding door, the third sliding door, the fourth sliding door, the fifth sliding door and the sixth sliding door is provided with a head jamb screen track 35 inside. The head jamb screen track 35 of the sixth sliding door is detachable. The door sill 31 on each of the fourth sliding door, the fifth sliding door and the sixth sliding door is provided with a screen track channel 37. The screen track channel 37 in each of the fourth sliding door, the fifth sliding door and the sixth sliding door is not provided with a sill screen track 36 inside. The screen track channel 37 in the sixth sliding door is provided with a detachable sill screen track 36 inside. The door sill 31 on each of the first sliding door, the second sliding door and the third sliding door is only provided with the sill screen track 36 and is not provided with the screen track channel 37, and the sill screen track 36 on the third sliding door is detachable.

Based on the structural features of the above-mentioned six existing sliding doors, the mounting method for mounting the adjustable retractable screen door by using the mounting accessory is specifically described as follows.

S1: a mounting method for the first sliding door:

S1-1: The lower mounting adapter 5 is mounted: the lower mounting adapter 5 is mounted on the door sill 31. The sill screen track 36 is embedded into the elongated gap 11. The lower mounting adapter 5 and the sill screen track 36 are fixedly connected through a screw. This screw is screwed in the screw channel 10 and penetrates through the stop leg 12 and the sill screen track 36. The lower end surface of the lower mounting adapter 5 is fitted to the door sill 31. The mounting angle is compensated through the elongated double-sided tape 22, so that the upper end surface of the lower mounting adapter 5 is horizontal. The lower mounting adapter 5 and the door sill 31 may be reconnected for reinforcement in a screw fastening way or an adhesive bonding way.

S1-2: The upper mounting adapter 27 is mounted. The upper mounting adapter 27 is mounted on the door head jamb 30. The adjustment block step 26 leans against an edge of the head jamb screen track channel 34. The adjustment block 7 is enabled to enter the head jamb screen track channel 34. The adjustment screw 14 is rotated to adjust the height of the adjustment block 7. The support legs 18 are enabled to be in contact with the rail end surface of the head jamb screen track 35 and to be squeezed until the mount surface 24 is adjusted to be in a horizontal state. Then, the screw is fed into the screw boss 13 and is screwed in the door head jamb 30 so that the upper mounting adapter 27 is fixedly connected to the door head jamb 30.

S1-3: The adjustable retractable screen door is mounted. The top screen channel 321 is slidably mounted below the upper mounting adapter 27 through the connector 25 so that the mounting of the top screen channel 321 on the door head jamb 30 is completed. The lower screen channel 322 is riveted on the lower mounting adapter 5. A side of the lower screen channel 322 clings to the lower mounting adapter stop 251, so that the mounting of the lower screen channel 322 on the door sill 31 is completed. Then, the upper end cap 101 and the lower end cap 102 respectively sleeve two ends of the screen housing 28. The handle slide body 40 on the handle housing 29 is in slidable fit with the first handle slide channel 39. A sliding fit solution is voluntarily selected on the basis of the solution in embodiment 3. Finally, the upper end cap 101 is in clamping connection to the top screen channel 321. The lower end cap 102 is in clamping connection to the lower screen channel 322. Then, the mounting of the adjustable retractable screen door is completed.

The second sliding door is different from the first sliding door. The head jamb screen track channel 34 on the second sliding door and the head jamb screen track channel on the first sliding door are different in width. For this case, upper mounting adapters 27 with different specifications are selected on the basis of the widths of the head jamb screen track channels 34. A mounting method for the second sliding door in S2 is not fundamentally different from the mounting method for the first sliding door in S1.

The third sliding door is different from the first sliding door. The head jamb screen track channel 34 on the third sliding door and the head jamb screen track channel on the first sliding door are different in longitudinal depth. The longitudinal depth (marked as d) of the head jamb screen track 35 is less than a spacing (marked as D) between an end of the adjustment block 7 and the support leg 18. Such differences will cause a difference in the mounting of the upper mounting adapter 27 in the mounting method for the third sliding door.

S3: a mounting method for the third sliding door.

S3-1: the lower mounting adapter 5 is mounted: the mounting method in S1-1 is adopted.

S3-2: The upper mounting adapter 27 is mounted. The upper mounting adapter 27 is mounted on the door head jamb 30. The adjustment block step 26 leans against an edge of the head jamb screen track channel 34. The adjustment block 7 is enabled to enter the head jamb screen track channel 34. Then, the adjustment screw 14 is rotated to adjust the height of the adjustment block 7. An end of the adjustment block 7 is enabled to be in contact with a bottom surface of the head jamb screen track channel 34 and to be squeezed until the mount surface 24 is adjusted to be in a horizontal state. Then, the screw is fed into the screw boss 13 and is screwed in the door head jamb 30 so that the upper mounting adapter 27 is fixedly connected to the door head jamb 30.

S3-3: The adjustable retractable screen door is mounted. The mounting method in S1-3 is adopted.

The fourth sliding door is different from the first sliding door. Any one of the door head jamb 30 and the door sill 31 of the fourth sliding door is provided with the head jamb screen track channels 34 and the screen track channel 37. Each of the head jamb screen track channels 34 and the screen track channel 37 is not provided with a screen door sliding rail. For this case, when the adjustable retractable screen door is mounted, the upper and lower ends are both mounted by selecting the upper mounting adapter 27.

S4: a mounting method for the fourth sliding door.

S4-1: The upper mounting adapter 27 is mounted. A pair of upper mounting adapters 27 is selected and mounted on the door head jamb 30 and the door sill 31.

S4-2: The upper mounting adapter 27 mounted on the door head jamb 30 is mounted. The adjustment block step 26 leans against an edge of the head jamb screen track channels 34. The adjustment block 7 is enabled to enter the head jamb screen track channel 34. Then, the adjustment screw 14 is rotated to adjust the height of the adjustment block 7. An end of the adjustment block 7 is enabled to be in contact with a bottom surface of the head jamb screen track channel 34 and to be squeezed until the mount surface 24 is adjusted to be in a horizontal state. Then, the screw is fed into the screw boss 13 and is screwed in the door head jamb 30 so that the upper mounting adapter 27 is fixedly connected to the door head jamb 30.

S4-3: The upper mounting adapter 27 mounted on the door sill 31 is mounted. The adjustment block step 26 leans against an edge of the screen track channel 37. The adjustment block 7 is enabled to enter the screen track channel 37. Then, the adjustment screw 14 is rotated to adjust the height of the adjustment block 7. An end of the adjustment block 7 is enabled to be in contact with a bottom surface of the screen track channel 37 and to be squeezed until the mount surface 24 is adjusted to be in a horizontal state. Then, the screw is fed into the screw boss 13 and is screwed in the door head jamb 30 so that the upper mounting adapter 27 is fixedly connected to the door sill 31.

S4-4: The adjustable retractable screen door is mounted. The top screen channel 321 is slidably mounted below the upper mounting adapter 27 through the connector 25 so that the mounting of the top screen channel 321 on the door head jamb 30 is completed. The lower screen channel 322 is slidably mounted below the upper mounting adapter 27 through the connector 25, so that the mounting of the lower screen channel 322 on the door sill 31 is completed. Then, the upper end cap 101 and the lower end cap 102 respectively sleeve two ends of the screen housing 28. The handle slide body 40 on the handle housing 29 is in slidable fit with the first handle slide channel 39 (a sliding fit solution is voluntarily selected on the basis of the solution in embodiment 3). Finally, the upper end cap 101 is in clamping connection to the top screen channel 321. The lower end cap 102 is in clamping connection to the lower screen channel 322. Then, the mounting of the adjustable retractable screen door is completed.

The existing fifth sliding door and fourth sliding door on the market have no fundamental difference in structural features of the screen channel 32. The mounting method for the fifth sliding door in S5 is the same as the mounting method for the fourth sliding door in S4.

The sixth sliding door is different from the fourth sliding door. Any one of the head jamb screen track channels 34 and the screen track channel 37 of the sixth sliding door is provided with the detachable head jamb screen track 35 and sill screen track 36 inside. The longitudinal depth (marked as d') of the head jamb screen track 35 and a base thereof is less than a spacing (marked as D) between an end of the adjustment block 7 and the support leg 18. The longitudinal depth (marked as d') of the sill screen track 36 and a base thereof is less than the spacing (marked as D) between the end of the adjustment block 7 and the support leg 18.

S6, a mounting method for the sixth sliding door is specifically described as follows.

S6-1: The upper mounting adapter 27 is mounted. A pair of upper mounting adapters 27 is selected and mounted on the door head jamb 30 and the door sill 31.

S6-2: The upper mounting adapter 27 mounted on the door head jamb 30 is mounted. The adjustment block step 26 leans against an edge of the head jamb screen track channels 34. The adjustment block 7 is enabled to enter the head jamb screen track channel 34. Then, the adjustment screw 14 is rotated to adjust the height of the adjustment block 7. An end of the adjustment block 7 is enabled to be in contact with an end surface of a base of the head jamb screen track 35 and to be squeezed until the mount surface 24 is adjusted to be in a horizontal state. Then, the screw is fed into the screw boss 13 and is screwed in the door head jamb 30 so that the upper mounting adapter 27 is fixedly connected to the door head jamb 30.

S6-3: The upper mounting adapter 27 mounted on the door sill 31 is mounted. The adjustment block step 26 leans against an edge of the screen track channel 37. The adjustment block 7 is enabled to enter the screen track channel 37. Then, the adjustment screw 14 is rotated to adjust the height of the adjustment block 7. An end of the adjustment block 7 is enabled to be in contact with an end surface of a base of the sill screen track 36 and to be squeezed until the mount surface 24 is adjusted to be in a horizontal state. Then, the screw is fed into the screw boss 13 and is screwed in the door head jamb 30 so that the upper mounting adapter 27 is fixedly connected to the door sill 31.

S6-4: The adjustable retractable screen door is mounted. The top screen channel 321 is slidably mounted below the upper mounting adapter 27 through the connector 25 so that the mounting of the top screen channel 321 on the door head jamb 30 is completed. The lower screen channel 322 is slidably mounted below the upper mounting adapter 27 through the connector 25, so that the mounting of the lower screen channel 322 on the door sill 31 is completed. Then, the upper end cap 101 and the lower end cap 102 respectively sleeve two ends of the screen housing 28. The handle slide body 40 on the handle housing 29 is in slidable fit with the first handle slide channel 39 (a sliding fit solution is voluntarily selected on the basis of the solution in embodiment 3). Finally, the upper end cap 101 is in clamping connection to the top screen channel 321. The lower end cap 102 is in clamping connection to the lower screen channel 322. Thus, the mounting of the adjustable retractable screen door is completed.

Based on the mounting method for the first sliding door in S1, when the longitudinal depth (marked as d') of the head jamb screen track 35 and a base thereof is less than a spacing (marked as D) between an end of the adjustment block 7 and the support leg 18, the scheme for mounting the upper mounting adapter 27 in S1 may be adopted.

In the description of the present invention, it should be understood that directional or positional relationships indicated by terms such as "upper," "lower," "front," "rear," "left" and "right" are directional or positional relationships based on the accompanying drawings, are merely intended to facilitate describing the present invention, rather than to indicate or imply that the appointed device or element has to be located in a specific direction or structured and operated in the specific direction so as not to be understood as restrictions on the present invention.

Finally, it should be noted that the above-mentioned embodiments are merely illustrated for describing the technical solutions of the present invention, without restricting the technical solutions of the present invention. Although detailed description of the present invention is given with reference to the above-mentioned embodiments, those of ordinary skill in the art should understand that they still can modify the technical solutions recorded in the above-mentioned various embodiments, or substitute part of the technical features therein with equivalents. These modifications or substitutes would not cause the essence of the corresponding technical solutions to depart from the spirit and scope of the technical solutions of the various embodiments of the present invention.

What is claimed is:

1. A door, comprising:

a retractable screen door (2); and a mounting accessory for connecting an upper end of the retractable screen door (2) with a door head jamb (30)

of a sliding door and for connecting a lower end of the retractable screen door (2) with a door sill (31) of the sliding door, wherein:

the retractable screen door (2) includes a screen housing (28), a screen (45), a handle housing (29), an upper end cap (101), a lower end cap (102), a top screen channel (321) and a lower screen channel (322);

the screen (45) is elastically rolled in the screen housing (28);

an end of the screen (45) is connected to the handle housing (29);

an upper end of the screen housing (28) is sleeved with the upper end cap (101);

a lower other end of the screen housing (28) is sleeved with the lower end cap (102);

the upper end cap (101) includes a first housing (3) for accommodating an end of the retractable screen door (2), a first elongated spring lock (9) and a first guide leg (4);

the lower end cap (102) includes a second housing (46) for accommodating an other end of the retractable screen door (2), a second elongated spring lock (48) and a second guide leg (47);

a screen outlet (8) allowing the screen (45) to be pulled out of the retractable screen door (2) is configured on a side of the screen housing (28), a side of the upper end cap (101) and a side of the lower end cap (102);

the first guide leg (4) and the screen outlet (8) are configured on a same side of the upper end cap (101);

the second guide leg (47) and the screen outlet (8) are configured on a same side of the lower end cap (102);

the upper end cap (101) is connected to the top screen channel (321) through the first guide leg (4);

the lower end cap (102) is connected to the lower screen channel (322) through the second guide leg (47);

the top screen channel (321) includes a first end cap connection channel (38), a first locking slot (33) and a first handle slide channel (39);

the lower screen channel (322) includes a second end cap connection channel (50), a second locking slot (51) and a second handle slide channel (49);

the first guide leg (4), which is in clearance fit with the first end cap connection channel (38), is inserted into an end of the first end cap connection channel (38);

the second guide leg (47), which is in clearance fit with the second end cap connection channel (50), is inserted into an end of the second end cap connection channel (50);

the first locking slot (33), which cooperates with the first elongated spring lock (9), is configured on an outer wall of an end of the top screen channel (321) to ensure that the first guide leg (4) and the first end cap connection channel (38) are securely connected;

the second locking slot (51), which cooperates with the second elongated spring lock (48), is configured on an outer wall of an end of the lower screen channel (322) to ensure that the second guide leg (47) and the second end cap connection channel (50) are securely connected;

a handle housing top slide (41) is configured on a side of an upper end of the handle housing (29);

a handle housing lower slide (42) is configured on a side of a lower end of the handle housing (29);

the handle housing (29) is in sliding fit with the top screen channel (321) through the handle housing top slide (41) and through the first handle slide channel (39);

the handle housing (29) is in sliding fit with the lower screen channel (322) through the handle housing lower slide (42) and through the second handle slide channel (49);

the first handle slide channel (39) includes an upper weatherstrip slot (431) and a top slide channel (441) adjacent to the upper weatherstrip slot (431);

the second handle slide channel (49) includes a lower weatherstrip slot (432) and a lower slide channel (442) adjacent to the lower weatherstrip slot (432);

a height of the upper weatherstrip slot (431) along a vertical direction is less than a height of the top slide channel (441) along the vertical direction;

a height of the lower weatherstrip slot (432) along the vertical direction is less than a height of the lower slide channel (442) along the vertical direction;

the handle housing top slide (41) is in sliding fit with one of the upper weatherstrip slot (431) and the top slide channel (441);

the handle housing lower slide (42) is in sliding fit with one of the lower weatherstrip slot (432) and the lower slide channel (442);

the mounting accessory includes an upper mounting adapter (27) and a lower mounting adapter (5);

the upper mounting adapter (27) includes an upper mounting block (6), an adjustment block (7) which cooperates with the upper mounting block (6) and a connector (25);

the upper mounting block (6) includes a screw boss (13), an adjustment screw (14) for adjusting a mounting height of the adjustment block (7) and a locator guide (15) for orienting the adjustment block (7);

the adjustment block (7) includes a threaded hole (16) and a guide bump (17) which cooperates with the locator guide (15) for positioning;

the adjustment block (7) is mounted on the upper mounting block (6) through the locator guide (15) and through the guide bump (17);

the upper mounting block (6) includes a clearance hole (141);

the adjustment screw (14), which penetrates into the clearance hole (141), is rotatably configured on the upper mounting block (6) through a retainer clip (142);

the adjustment screw (14), which is in thread fit with the threaded hole (16), rotates itself to drive the adjustment block (7) which is caused to move toward or move away from the upper mounting block (6);

the upper mounting block (6) further includes a connection slot (601) and an alignment tab (602);

the connector (25) is in clamping connection with the upper mounting block (6) through the connection slot (601);

the lower mounting adapter (5) has a quadrangular cross section, a horizontal upper end surface and an obliquely-disposed lower end surface;

the lower mounting adapter (5) includes a screw channel (10) on its horizontal side and an elongated gap (11) on its lower end surface;

a side of the elongated gap (11) includes a stop leg (12);

a side of the adjustment block (7) is connected to a support leg (18);

a side of the upper mounting block (6) includes an adjustment block step (26) which is a step;

the upper mounting block (6) includes a mounting block top surface (23) and a mount surface (24);

the screw boss (13), the adjustment screw (14) and the locator guide (15) protrude out of the mounting block top surface (23);

the screw boss (13) includes a columnar clearance hole (141);

the locator guide (15) is columnar;

the guide bump (17) and the locator guide (15) cooperate in their shapes;

the connection slot (601) and the alignment tab (602) protrude out of the mount surface (24);

the connector (25) is mounted on the mount surface (24);

a side of the horizontal upper end surface of the lower mounting adapter (5) includes a lower mounting adapter stop (251);

the lower mounting adapter stop (251) protrudes out of the horizontal upper end surface of the lower mounting adapter (5);

the connector (25) is slidably connected to the first end cap connection channel (38) in the top screen channel (321);

the alignment tab (602) is in clearance fit with the first end cap connection channel (38) to secure a slidable connection between the upper mounting adapter (27) and the top screen channel (321);

the upper mounting adapter (27) is configured to position and fixedly connect the top screen channel (321) and the door head jamb (30); and the lower mounting adapter (5) is configured to position and fixedly connect the lower screen channel (322) and the door sill (31).

2. The door in claim 1, wherein the first guide leg (4) and the first housing (3) are configured on an integrated piece.

3. The door in claim 1, wherein:

the first elongated spring lock (9) includes a locking projection (20); and the locking projection (20) engages the first locking slot (33) for locking and connecting parts.

4. The door in claim 3, wherein a spring stripe (21) is configured between the first elongated spring lock (9) and the first guide leg (4).

5. The door in claim 4, wherein the spring stripe (21) has an arc shape.

6. The door in claim 1, wherein the locator guide (15) is in clearance fit with the guide bump (17).

7. The door in claim 1, wherein:

the connector (25) is slidably connected to the first end cap connection channel (38) in the top screen channel (321); and the alignment tab (602) is in clearance fit with the first end cap connection channel (38) to attain a slidable connection between the upper mounting adapter (27) and the top screen channel (321).

8. The door in claim 1, wherein a lower end surface of the lower mounting adapter (5) includes a stripe-shaped an elongated double-sided tape (22) for compensating a mounting angle.

9. The door in claim 8, wherein the elongated double-sided tape (22) is a foam gasket or a rubber gasket.

* * * * *